US011606690B1

(12) United States Patent
Robinson et al.

(10) Patent No.: US 11,606,690 B1
(45) Date of Patent: Mar. 14, 2023

(54) CONFIDENCE BASED NETWORK PROVISIONING OF DEVICES

(71) Applicant: Amazon Technologies, Inc., Seattle, WA (US)

(72) Inventors: Quentin N Robinson, Seattle, WA (US); Abraham Martin Passagia, Seattle, WA (US); Rashmesh Radhakrishnan, Snohomish, WA (US); Andrew Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 635 days.

(21) Appl. No.: 16/682,230

(22) Filed: Nov. 13, 2019

(51) Int. Cl.
*H04W 12/08* (2021.01)
*H04W 76/10* (2018.01)
*H04W 4/029* (2018.01)
*H04W 84/12* (2009.01)
*H04B 17/318* (2015.01)

(52) U.S. Cl.
CPC .......... *H04W 12/08* (2013.01); *H04B 17/318* (2015.01); *H04W 4/029* (2018.02); *H04W 76/10* (2018.02); *H04W 84/12* (2013.01)

(58) Field of Classification Search
CPC ..... H04W 12/08; H04W 4/029; H04W 76/10; H04B 17/318
See application file for complete search history.

(56) References Cited

U.S. PATENT DOCUMENTS

| 9,801,066 B1* | 10/2017 | Hanley | G06Q 20/405 |
| 2013/0227651 A1* | 8/2013 | Schultz | G06F 21/32 |
| | | | 726/4 |
| 2016/0180068 A1* | 6/2016 | Das | H04L 63/0861 |
| | | | 726/7 |

* cited by examiner

*Primary Examiner* — Mohammad S Anwar
(74) *Attorney, Agent, or Firm* — Kilpatrick Townsend & Stockton LLP

(57) ABSTRACT

Techniques for establishing a data connection are described. In an example, a computer system receives, from a second device of a computer network, first data associated with a first device and second data associated with the second device. The first device is not connected to the computer network. The computer system determines third data generated by one or more devices other than the first device and the second device and associated with at least one of: the first device, the second device, a user account, or the computer network. The computer system generates, based on the first data, the second data, and the third data, a confidence score indicating a likelihood of a user authorization to connect the first device to the computer network. The computer system sends, to the second device based on the confidence score, instructions associated with connecting the first device to the computer network.

20 Claims, 11 Drawing Sheets

CONFIDENCE BASED NETWORK PROVISIONING OF DEVICES

BACKGROUND

Most computing devices, such as consumer electronics, support wireless connectivity. Typically, a computing device connects to a wireless access point that provides access to a data network. In many cases, the data network is a secure home network that is accessible to the computing device based on a credential, such as a passphrase. In such cases, different techniques are available to create a secure wireless home network. For example, Wi-Fi Protected Access (WPA) is a network security protocol that allows a user to securely connect the computing device to the secure wireless home network via the wireless access point. The WPA technique and other connection techniques generally rely on user input at the computing device and/or the wireless access point to establish the connection.

BRIEF DESCRIPTION OF THE DRAWINGS

Various embodiments in accordance with the present disclosure will be described with reference to the drawings, in which.

DETAILED DESCRIPTION

Figure 1:
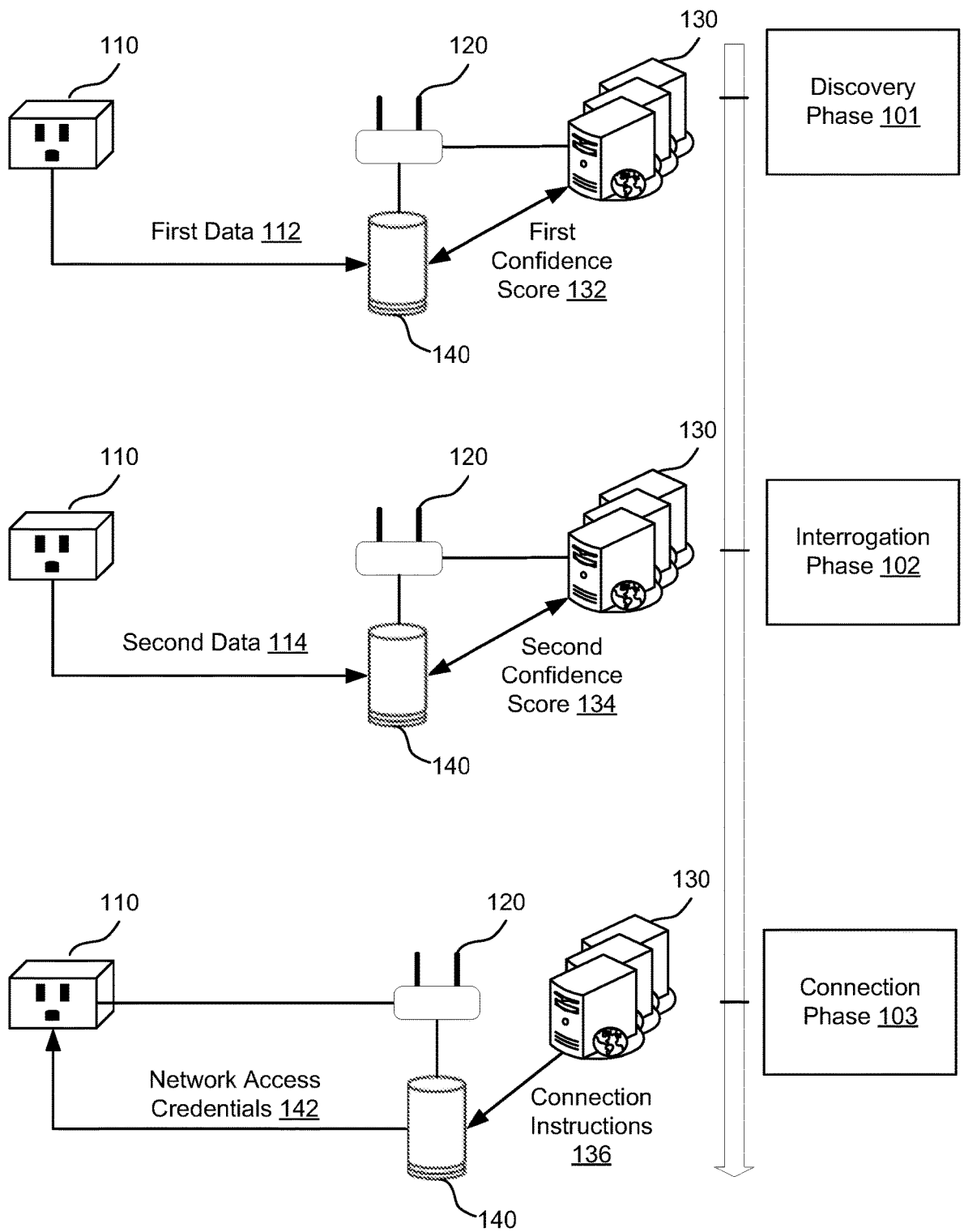
FIG. 1 illustrates an example of phases for connecting a provisionee to a secure network via an access point of a secure network, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A confidence-based authorization process is disclosed herein that enables a device to be added to a secure computer network upon a trigger event (e.g., first time the device is powered on) and without user intervention from the trigger event and on. The confidence-based authorization prevents unauthorized access to the secure computer network. In particular, the confidence-based authorization prevents unauthorized devices from receiving access credentials to the secure computer network by generating a relying on a confidence score that determines a likelihood that the device can be properly and securely added to the secure computer network. If the confidence score exceeds a threshold, then the access credentials can be transmitted to the device as the device is likely authorized to connect to the network.

In an example, the secure computer network includes a provisioner (e.g., a computing device already connected to the secure computer network and configured to facilitate a connection of a device to the secure computer network) and an access point (that may, but need not, include the provisioner). A provisionee is the device to be connected to the secure network and has a data link to the provisioner. The confidence-based authorization process includes multiple phases. The outcome of performing the confidence-based authorization process varies depending on the phases and includes any of: sending instructions to facilitate access of the provisionee to the secure computer network or sending instructions to trigger a manual set-up for the access.

In a first phase of the confidence-based authorization process, the provisioner receives a device identifier from the provisionee over the data link, where the device identifier may uniquely identify the provisionee (e.g., such as being a stock keeping unit (SKU) of the provisionee). The provisioner transmits the device identifier to a server in an event message that may include other data related to the provisionee and/or provisioner (e.g., a signal strength of the data link between the provisionee and the provisioner). The server generates a first confidence score based on the event message and based on data associated with the device and available from one or more sources other than the device. If the first confidence score falls between a first threshold and a second threshold, the confidence-based authorization process continues to a second phase. If the first confidence score is smaller than the first threshold, the server sends a response including instructions for the manual set-up. If the first confidence score is larger than the second threshold, the server sends instructions to the provisioner to facilitate the access of the provisionee to the secure computer network by, for instance, sending an identifier and a credential of the secure computer network (e.g., a service set identifier (SSID) and a passphrase) to the provisionee. In certain situations, such as depending on the device type of the provisionee, the second phase may follow the first phase even when the first confidence score is larger than the second threshold.

In a second step of the confidence-based authorization process, the server can request additional data from the provisionee and/or the provisionee to update the confidence score. For instance, the server may request, via the provisioner, a digital certificate of the provisionee and a list of networks discovered by the provisionee. Upon receiving such data, the server generates a second confidence score (which may, but need not, be an update of the first confidence score) and compares the second confidence score to a third threshold (which may be the same or different from the second threshold). If the second confidence score is smaller than the third threshold, the server sends a response including instructions for the manual set-up. If the second confidence score is larger than the third threshold, the server sends instructions to the provisioner to facilitate the access of the provisionee to the secure computer network.

To illustrate, consider an example of a home network of a user, where this network includes a voice controlled media device (VCMD) that provides personal assistant and media streaming services. the VCMD may be registered to the user with a service provider under a user account. The user may acquire a smart plug from the service provider or from a third party. In these two phases, the thresholds can be set depending on the device type of the provisionee.

In this illustrative example, upon power on, the smart plug establishes a Wi-Fi link to the VCMD and sends a Wi-Fi beacon probe that includes the smart plug's SKU as a signal to the VCMD. The VCMD sends the SKU and the signal's received signal strength indicator (RSSI) to the server. In turn, the server determines that the SKU is associated with the user account but the RSSI indicates a weak signal (e.g., below a signal threshold) and, therefore, the smart plug may be at some distance away from the VCMD that exceeds a predefined distance. The resulting confidence score falls between the first and second threshold. Hence, the server proceeds to interrogating the smart plug via the VCMD. In particular, the server requests and receives a list of SSIDs discovered by the smart plug and an internet protocol (IP) address of the smart plug. The list indicates that the smart plug only discovered the home network. Based on the IP address, the server performs a call to a geo-IP server to receive a geo-location of the smart plug and determines that this geo-location is within a same area as the VCMD. Accordingly, the server increases confidence score, resulting in this score exceeding the third threshold. Hence, the server sends instructions to the VCMD to provide an SSID and a passphrase associated with the home network to the smart plug. In turn, the smart plug uses the SSID and passphrase to join the home network.

Embodiments of the present disclosure provide multiple technical advantages over existing systems and methods for connecting a computing device to a computer network. For example, the embodiments improve the scalability. In particular, a computing device can join a secure computer network in an automated and seamless manner without necessitating any user input (beyond powering on the computing device). Thus, the embodiments support adding any and large numbers of computing devices with minimal user effort. Whether the user is adding their first Internet of Things (IoT) device or their hundredth one, the effort may merely involve the user powering on this computing device to add the computing device to the secure computer network. In addition, the embodiments improve the security of the computer network. In particular, the connection to the secure network is established by following multiple phases. In each of such phases, a confidence score, based on information associated with the computing device and obtained during that phase, may be generated to identify a likelihood that the computing device is authorized to join the secure computer network. The confidence score is compared to thresholds that are set based on the device type of the computing device to determine if access should or should not be granted to the new device. Thus, confidence scores (and variable thresholds) prevent unauthorized devices from being added to the secure computer network. These and other improvements are further described in connection with the next figures.

In the interest of clarity of explanation, various embodiments of the present disclosure are described in conjunction with a Wi-Fi connection that uses a WPA-based security protocol (e.g. WPA-Personal, WPA/WPA2-PSK, or WPA-Enterprise). However, the embodiments are not limited as such and similarly apply to any other type of connections, whether wired or wireless, and to any other type of security protocols.

FIG. 1 illustrates an example of phases for connecting a provisionee 110 to a secure network via an access point 120 (e.g., a router, gateway, proxy device, etc.) of the secure network, according to an embodiment of the present disclosure. The provisionee 110 represents a computing device that is not already on the secure network. Generally, the provisionee 110 is first associated with a user account. Upon a trigger event, the provisionee 110 sends a request associated with connecting to a data network. A server 130 manages addition of devices, such as the provisionee 110, to the secure network. A provisioner 140, such as a computing device that is already on the secure network, receives and sends the request to the server 130. In turn, the server 130 uses information within the request to generate a confidence score indicating a likelihood of whether the provisionee 110 is authorized to join the secure network. If so, the server 130 instructs the provisioner 140 to facilitate the access of the provisionee 110 to the secure network, where facilitating the access can include sending relevant information to the provisionee 110 to establish a data link to the access point 120. FIG. 1 shows this approach in multiple phases.

As illustrated, at a discovery phase 101, the provisionee 110 discovers nearby computing devices, including the provisioner 140, and sends first data 112 in the request. In particular, a trigger event, such as first power on or a reconnection event, causes the provisionee 110 to send the request. The request can be sent as a message in a broadcast. For instance, as part of the discovery, the provisionee 110 establishes a Wi-Fi link with the provisioner 140 and sends a beacon probe that includes the first data 112. The first data 112 can include various parameters usable to determine whether the provisionee 110 is authorized to join the secure network. Examples of such parameters are further described herein below. For instance, the first data 112 includes device identifier of the computing device (e.g., media access control (MAC) address, a stock keeping unit (SKU), or the like).

The provisioner 140 receives and sends the first data 112 to the server 130. For instance, the first data 112 can be sent in a message over a secure communication link (e.g., one using a transport layer security (TLS)) to the server 130. The provisioner 140 can include additional data in the message, where this additional data is also usable in determining the likelihood of the authorization to add the provisionee 110 to the secure network. The additional data includes various parameters that are further described herein below. For instance, the additional data includes an RSSI value of the signal between the provisionee 110 and the provisioner 140.

The server 130 receives the message from the provisioner 140 and generates a first confidence score 132 from the data included in the message and from data available from other resources. For instance, the server 130 identifies a user account associated with the device identifier sent from the provisionee 110 and a user account associated with the provisioner 140. If the two user accounts are the same, the first confidence score 132 is increased. Further, the server 130 can determine that the device identifier was added within a predefined time frame to the user account (e.g., based on a user purchase of the provisionee 110), determine from a delivery service that the provisionee was delivered to an area associated with the secure network (or the provisioner 140), and/or that IP address of the provisionee 110 corresponds to a geolocation that falls within the area. If so, the first confidence score 132 may be further increased. These and other parameters can be weighted to generate the first confidence score 132, where the weights can depend on the device type of the provisionee 110.

The server 130 determines thresholds to which the first confidence score 132 is compared. For instance, the thresholds are set based on the device type of the provisionee 110. In particular, for computing devices capable of one or two way audio and/or video communications or providing any security functionalities, the thresholds can be relatively increased to other device types. If the first confidence score 132 is lower than a first threshold, the server 130 determines that a manual set-up is needed and sends instructions to the provisioner 140 to prompt a manual set-up process. If the first confidence score 132 falls between the first threshold and a second, higher threshold, the server 130 determines that additional data is needed to determine the likelihood of the authorization to add the provisionee 110 to the secure network. Accordingly, the server 130 can trigger the next phase. If the first confidence score 132 is larger than the second threshold, the server 130 can trigger the last phase, where the provisioner 140 is instructed to facilitate access of the provisionee 110 to the secure network. In certain situations and depending on the device type of the provisionee 110 (e.g., when capable of one or two way communications or providing any security functionalities), the server 130 triggers the next phase even when the first confidence score 132 exceeds the second threshold.

In an example, the next phase is an interrogation phase 102 at which the server 130 interrogates the provisioner 140 and/or the provisionee 110 via the provisioner for additional data to then determine the likelihood of the authorization. In particular, the server 130 sends instructions to the provisioner 140 to collect and send the additional data. The additional data can relate to the provisionee 110 (e.g., the digital certificate of the provisionee 110), environmental data of the location where the provisionee 110 and/or provisioner 140 are located (e.g., optical data generated by an optical sensor(s), temperature data generated by temperature sensor(s)), random data sent by the server 130 to the provisioner 140 and relayed by the provisioner 140 to the provisionee 110, and/or a user confirmation received from an application executing on the provisioner 140 or on a user device associated with the same user account as the provisioner 140.

Upon receiving the additional data in, for example, one or more messages from the provisioner 140, the server 130 generates a second confidence score 134 based on the additional data. For instance, if the digital certificate indicates that the provisionee 110 was manufactured by a particular or trusted entity, that the environmental data of the provisionee 110 and the provisioner 140 match each other, that the environmental data of the provisionee 110 matches environmental data stored under the user account associated with the provisioner 140, the random number sent back from the provisionee 110 matches the random number sent from the server 130, and the user confirmation was received, the server 130 can increase the second confidence score 134. As used herein, a match between two items indicates a similarity between the two items. An exact match indicates that the two items are the same. A similar match indicates that the items have a common set of attributes.

In an example, the server 130 generates the second confidence score 134 merely from the additional data. In another example, the server 130 generates the second confidence score 134 as an update to the first confidence score 132. In both case, the different parameters included in the additional data can be weighted to generate the second confidence score 134, where the weights can depend on the device type of the provisionee 110.

At the interrogation phase 102, the server 130 also determines one or more thresholds to which the second confidence score 134 is compared. These thresholds can be the same as the thresholds used in the discovery phase 101 or can be different from the ones used in the discovery phase 101. If different, the thresholds used in the interrogation phase 102 can also be set based on the device type of the provisionee 110 and are generally larger than the corresponding thresholds used in the discovery phase 101.

If the second confidence score 134 is lower than a first threshold of the interrogation phase 102, the server 130 determines that a manual set-up is needed and sends instructions to the provisioner 140 to prompt a manual set-up process. If the second confidence score 134 falls between the first threshold and a second, higher threshold of the second interrogation phase 102, the server 130 determines that additional data is needed to determine the likelihood of the authorization to add the provisionee 110 to the secure network. Accordingly, the server 130 can continue with the interrogation by requesting additional data from the provisionee 110, the provisioner 140, and/or other sources. If the first confidence score 132 is larger than the second threshold of the interrogation phase 102, the server 130 can trigger the last phase.

In an example, the last phase is a connection phase 103 at which the server 130 instructs the provisioner 140 to facilitate access of the provisionee 110 to the secure network. In particular, the server 130 sends connection instructions 136 to the provisioner 140 to trigger the access. Different data can be included in the connection instructions 136.

For instance, the connection instructions 136 includes a network identifier (e.g., an SSID) the secure network and a credential (e.g., a passphrase) associated with the secure network. In this illustration, the provisioner 140 forwards the network identifier and the credential to the provisionee 110. In turn, the provisionee 110 searches for and finds the access point 120 based on the network identifier and presents the credential thereto to then access the secure network.

In another illustration, the connection instructions 136 request the provisioner 140 to set-up a temporary access point associated with a network identifier and a credential for a temporary network. The provisionee 110 can join this temporary network first to then receive a network identifier and a credential associated with the secure network and subsequently join the secure network. Further examples about this connection process is described in FIG. 4.

In the interest of clarity of explanation, FIG. 1 describes multiple phases that involve particular computing components. However, embodiments of the present disclosure are not limited as such. For example, the server 130 may be a cloud-server and/or a computing component of a backend system that includes one or more servers. The functionalities of the server-based setup process can be distributed within the backend system. In another example, the access point 120 can be implemented as a soft hub executed by a second computing device of the user already on the secure network. Upon the provisionee 110 joining the secure network, the second computing device can terminate the execution of the soft hub. In addition, the access point 120 and the provisioner 140 may be a same device.

Although FIG. 1 illustrates using the same provisioner 140 in the three phases 101-103, the embodiments of the present disclosure are not limited as such. Instead, a different device can be used as a provisioner in the three phases 101-103. For instance, in the connection phase 103, the server 130 sends the connection instructions 136 to a provisioner different from the provisioner 140.

Furthermore, although FIG. 1 illustrates that the provisioner 140 is a device of the secure network, the embodiments of the present disclosure are not limited as such. Instead, a device that is on another computer network, whether secure or open, can be used as the provisioner in any of the three phases 101-103 to determine whether the provisionee 110 is likely authorized to connect to the secure network and/or to actually connect the provisionee 110 to the secure network.

Figure 2:
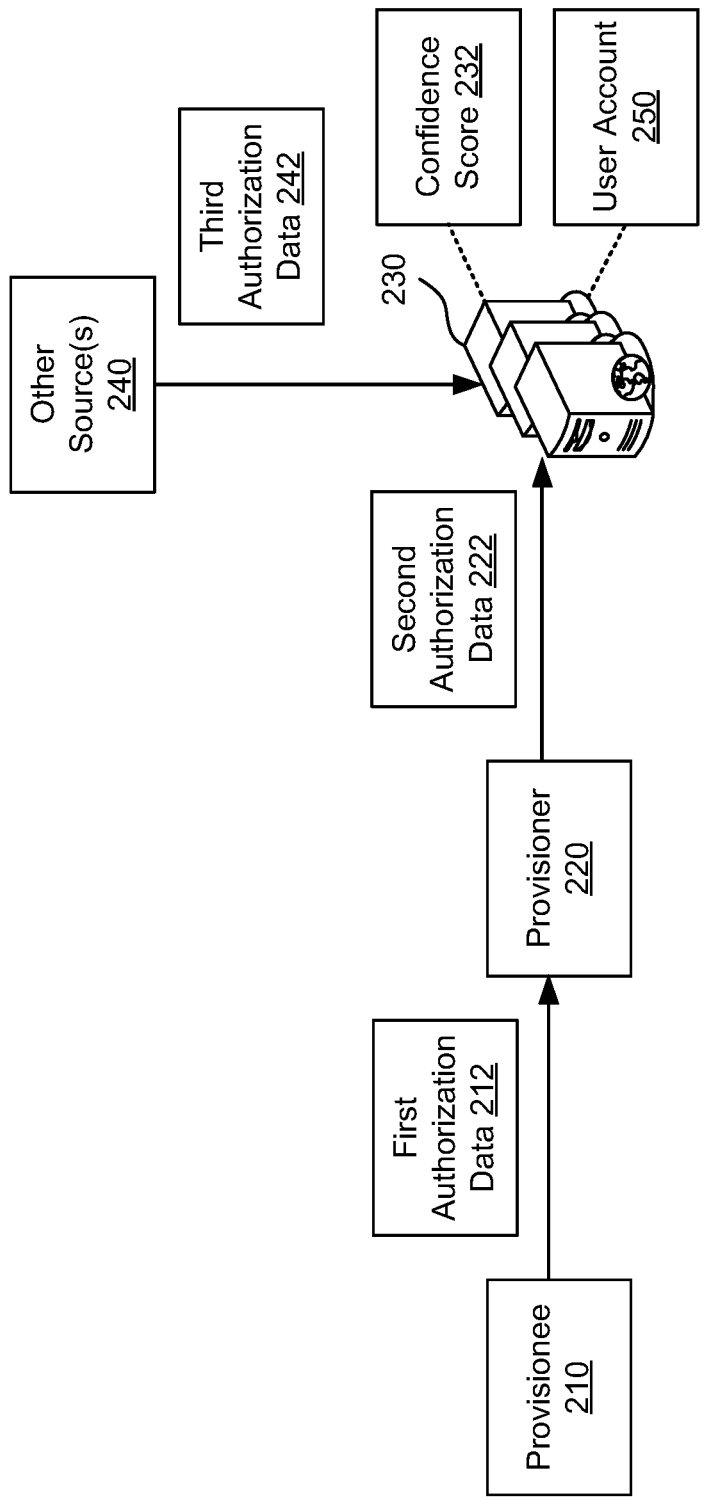
FIG. 2 illustrates an example of a discovery phase of a confidence-based authorization process, according to an embodiment of the present disclosure.

FIG. 2 illustrates an example of a discovery phase of a confidence-based authorization process, according to an embodiment of the present disclosure. A data link, such as a Wi-Fi link, exists between a provisionee 210 and a provisioner 220 that is on a secure network. A secure data link, such as one using TLS, exists between the provisioner 220 and a server 230. In the discovery phase, the provisionee 210 sends first authorization data 212 to the provisioner 220 and the provisioner 220 sends the first authorization data 210 with second authorization data 222 to the server 230. The server 230 determines third authorization data 242 from one or more other sources 240 and generates a confidence score 232 based on the first authorization data 212, the second authorization data 222, and/or the third authorization data 242. Generally, authorization data represents data that is usable by the server to determine whether the provisionee 210 is authorized to join the secure network, as for instance, a likelihood of the authorization. The provisionee 210, the provisioner 220, and the server 230 are examples of the provisionee 110, the provisioner 140, and the server 130, respectively, of FIG. 1.

In an example, the first authorization data 212 includes a first set of parameters. The first set includes a device identifier, such as the SKU, of the provisionee 210. The first set can also include an RSSI of a signal received by the provisionee 210 from the provisioner 220. The first set can further include a list of identifiers of computer networks detected by the provisionee 210 based on an active or passive scanning of computer networks. In addition, the first set can include an IP address of the provisionee 210, where the server can use one of the other source(s) to determine a geo-location of the provisionee 210 from the IP address.

In an example, the second authorization data 222 includes a second set of parameters. The second set includes a device identifier, such as the SKU, of the provisioner 220. The second set can also include an RSSI of a signal received by the provisioner 220 from the provisionee 210. The second set can further include a list of identifiers of computer networks detected by the provisioner 220 within a predefined time window from receiving the first authorization data 212.

In addition, the second set can include an IP address of the provisionee 210. The server 230 can use one of the other source(s) to determine a geo-location of the provisioner 220 from the IP addresses and can identify an Internet service provider (ISP) form this IP address and, optionally, based on IP address of other devices. The provisioner 220 and these other devices are associated with the same user account.

In an example, the third authorization data 242 can be stored in association with a user account 250. Some of the third authorization data 242 can be associated with the provisionee 210, while other portions of the third authorization data 242 can be associated with the provisioner 220. For instance, upon a purchase of the provisionee 210, a device identifier of the provisionee 210 is received from a point of sale device or some other source and added to the user account 250. Upon a delivery of the provisionee 210 to a location, a confirmation about the delivery is added to the user account 250. A description of the location (e.g., a location address) and a time of the delivery can also be added to the user account 250. A timer can be initiated upon the purchase, and a value of the timer can be added and updated in the user account 250. In this example, the third authorization data 242 includes any or all of the device identifier, the location identifier, the delivery confirmation, and/or the delivery time. The third authorization data 242 can also include a unique user identifier associated with the provisioner 220 and barcode associated with the provisionee 210. In addition, the server 230 can add to the user account, or perform a call to one of the other source(s) 240 to receive, fraud-related data based on behavioral activity at the provisioner 220 and/or the secure network level. Similarly, the server 230 can add to the user account, or perform a call to one of the other source(s) 240 to receive, environmental data based associated with the provisionee 310, the provisioner 220, or the secure network (e.g., add weather data, such as temperature data associated with location(s) of the provisionee 210 and the provisioner 220). In these illustrative examples, the other sources 240 include point of sale system, a purchase order system, a delivery system, a fraud protection system, a weather system, and the like.

The server 230 generates the confidence score 232 based on the values of the parameters from the first authorization data 212, the second authorization data 222, and/or the third authorization data 242.

To illustrate the use of the above parameters, consider the following example. Upon a purchase of the provisionee 210 based, in part, on using the user account 250, the device identifier of the provisionee 210 is added to the user account 250 and a thirty-day window is initiated by triggering the timer. Upon the first power on, the server 230 receives the device identifiers of the provisionee 210 and provisioner 220, the RSSI measured by the provisioner 220, and the IP address of the provisionee. The server 230 determines that the two device identifiers are associated with the same user account 250 and determines that the RSSI indicates that the provisionee 210 is in close proximity to the provisioner 220. Based on a geo-location application programming interface (API) call, the server 230 determines that the provisionee 210 is at a certain location. The server 230 matches that location from a location of the provisioner 220, where the latter location can be determined from the user account 250. In addition, and based on a delivery notification API call, the server 230 determines that the provisionee 210 was delivered to a location that matches the location in the user account 250 and that the delivery occurred within the thirty-day time window. The server 230 also determines that no fraudulent behavior has been detected within the time window. Accordingly, the server 230 generates the confidence score 232 to have a high value (e.g., close to if not equal to one-hundred percent).

In another scenario, the server 230 determines that the provisionee 210 and the provisioner 220 are not associated with the same user account, that the two devices are not proximate to each other, and that no delivery confirmation is available. In this scenario, the server 230 generates the confidence score 232 to have a low value (e.g., close to if not equal to zero percent).

In yet another scenario, the server 230 determines that the provisionee 210 and the provisioner 220 are associated with the same user account, that the two devices are proximate to each other, and that a delivery confirmation is available. However, the server 230 detects that fraudulent activity exists and that the delivery is outside of the thirty-day window. In this scenario, the server 230 generates the confidence score 232 to have a medium value (e.g., close to seventy percent).

In an example, when generating the confidence score 232, the different parameters can be weighed. The weights can be set based on the device type of the provisionee 210. For instance, if the device is capable of two-way communications or surveillance functionalities, the weights associated with the list of networks and IP addresses can be increased.

Examples of the above parameters with weights are shown in Table 1 below. Although the weights are expressed in terms of low or high any weighting scheme may be employed such as a numerical scheme in which weights are assigned real numbers (e.g., a real number between zero and one hundred). In addition, although the various parameters are described, the server 230 may use only a subset of the parameters to generate the confidence score 232.

TABLE 1

| Parameter | Weight |
| --- | --- |
| SKU from a purchase order and associated with provisionee | High |
| Delivery confirmation | Low |
| User identifier associated with provisioner | High |
| SKU associated with provisionee | High |
| RSSI (from provisionee and/or provisioner). Server can estimate distance between the two devices based on RSSI | Low |
| A time window after the purchase order, and whether provisionee was detected by provisioner within the time window | Low |
| List of networks detected by provisionee | High |
| Indication that purchase order is associated with user identifier | Low |
| List of networks detected by provisioner. Server can match with list sent from provisionee | Low |
| Barcode associated with the provisionee | High |
| ISP as determined from Internet Protocol (IP) addresses | Low |
| Geo-location of provisionee | Low |
| Fraud protection data | High |

Figure 3:
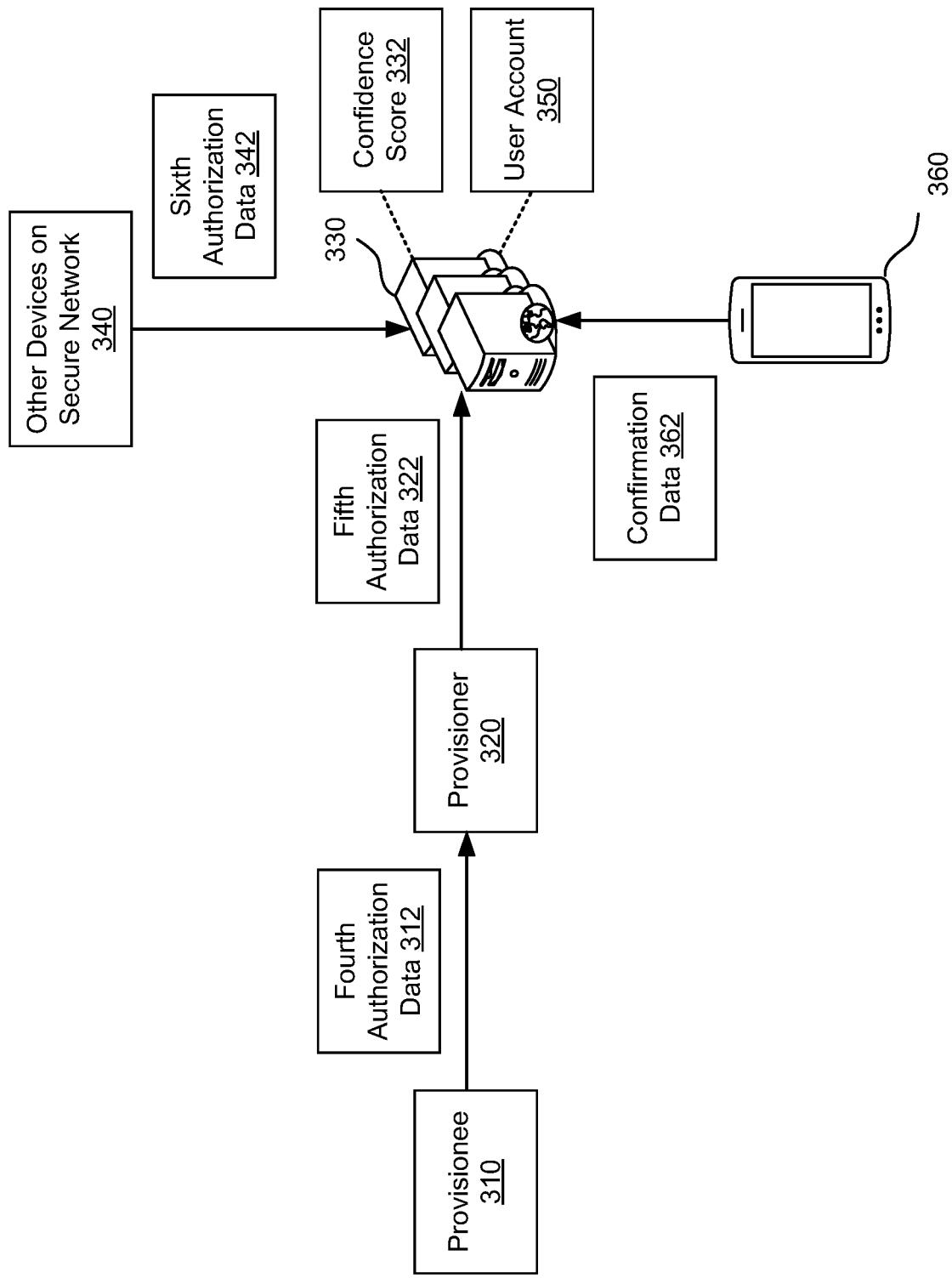
FIG. 3 illustrates an example of an interrogation phase of a confidence-based authorization process, according to an embodiment of the present disclosure.

FIG. 3 illustrates an example of an interrogation phase of a confidence-based authorization process, according to an embodiment of the present disclosure. A data link, such as a Wi-Fi link, exists between a provisionee 310 and a provisioner 320 that is on a secure network. A secure data link, such as one using TLS, exists between the provisioner 320 and a server 330. In the discovery phase, the provisionee 310 sends fourth authorization data 312 to the provisioner 320 and the provisioner 320 sends the fourth authorization data 312 with fifth authorization data 322 to the server 330. Unlike the discovery phase, as illustrated in FIG. 2, the server 330 determines sixth authorization data 342 from one or more devices 340 on the secure network (rather than from sources 340 that may not be on the secure network). In addition, the server 330 can receive confirmation data 362 from a user device 360 associated with the same user account 350 as the provisioner 320. The server 330 generates a confidence score 332 based on the fourth authorization data 312, the fifth authorization data 322, the sixth authorization data 342, and/or the confirmation data 362. The provisionee 310, the provisioner 320, and the server 330 are examples of the provisionee 110, the provisioner 140, and the server 130, respectively, of FIG. 1.

In an example, the fourth authorization data 312 is sent based on one or more requests of the server 330 for such data. The server 330 can send the request(s) as a set of instructions to the provisioner 320 and, in turn, the provisioner 320 can request and receive the fourth authorization data 312 from the provisionee 310. The fourth authorization data 312 includes a fourth set of parameters. The fourth set can include a digital certificate of the provisionee 310, where the digital certificate can identify a manufacturer of the provisionee 310 and other information about the manufacturer or the provisionee 310. In addition, the fourth set can include random data. In particular, the server 230 can generate random data and instruct the provisioner 320 to send the server-generated random data to the provisionee 310. The provisioner 320 can do so over the Wi-Fi link or over some other data link (e.g., a Bluetooth link, an audio link, etc.). In turn, the provisionee 310 may receive this sever-generated random data and send back the received random data in the fourth authorization data 312 over the Wi-Fi link. Further, the fourth set can include environmental data generated by the provisionee 310, such as optical data generated by an optical sensor (e.g., a camera device), audio data generated by an audio sensor (e.g., a microphone), and/or temperature data generated by a temperature sensor. In addition, the fourth set can include a subset of the parameters from the first set discussed in FIG. 2, such as the list of networks detected by the provisionee 310 and the IP address of the provisionee.

In an example, the fifth authorization data 322 is sent based on one or more requests of the server 330 for such data. The server 330 can send the request(s) as a set of instructions to the provisioner 320 and, in turn, the provisioner 320 can respond with the requested data. The fifth authorization data 322 includes a fifth set of parameters. The fifth set can include environmental data generated by the provisioner 320, such as optical data generated by an optical sensor (e.g., a camera device), audio data generated by an audio sensor (e.g., a microphone), and/or temperature data generated by a temperature sensor. In addition, the fifth set can include a subset of the parameters from the second set discussed in FIG. 2, such as the list of networks detected by the provisioner 320.

In an example, the sixth authorization data 342 is sent based on one or more requests of the server 330 for such data. The server 330 can send the request(s) as a set of instructions to the other device(s) 340 and, in turn, the device(s) 340 can respond with the requested data. Each of such devices(s) 340 can be a provisioner. In this case, the server 330 can select the provisioner 320 over such devices 340 for the connection phase randomly or based on some of the parameters (e.g., the RSSI of the provisioner 320 being the largest, a user setting, etc.). Alternatively, the server 330 can determine the user account 350 associated with the provisioner 320 based on a device identifier of the provisioner 320 and identify the devices 340 from the user account 350. The sixth authorization data 342 includes a sixth set of parameters. The sixth set can include environmental data generated by some or all of the device(s) 340, such as optical data generated by an optical sensor (e.g., a camera device), audio data generated by an audio sensor (e.g., a microphone), and/or temperature data generated by a temperature sensor. In addition, the sixth set can include indications of whether each of the devices 340 detected the provisionee 310 (e.g., based on its Wi-Fi beacon probe in the discovery phase). In other words, environmental data can be collected from any of the provisionee 310, the provisioner 320, and/or one or more of the devices 340.

In an example, the confirmation data 362 is sent based on one or more requests of the server 330 for such data. The server 330 can send the request(s) as a set of instructions to the user device 360 and, in turn, the user device 360 can respond with the requested data. The user device 360 may, but need not be, the same as the provisioner 320 or any of the other devices 340. If different, the server 330 can determine the user account 350 associated with the provisioner 320 based on the device identifier of the provisioner 320 and identify the user device 360 from the user account 350. Generally, the user device 360 includes a user interface, such as a graphical user interface, to present a request for confirming whether the provisionee 310 is authorized to join the secure network and to receive user input confirming the authorization. For instance, the user device 360 is a smart phone, a tablet, a laptop, or a desktop computer executing an application that receives the one or more requests of the server 330 and presents the user interface. The application can be an email application (where the one or more requests can be sent to an email address identified from the user account 350), a service provider application (where the request can be presented as a push notification), a text message application (where the request can be presented in a text message that includes a link to provide the confirmation), a personal assistant application (where the request can be presented via a voice-based interface and the confirmation can be received as a user utterance), or other types of application. The received user input is sent by the user device 360 as the confirmation data.

In an example, the server 330 generates the confidence score 332 based on the values of the parameters from the fourth authorization data 312, the fifth authorization data 322, the sixth authorization data 342, and/or the confirmation data 362. The different parameters can be weighed. The weights can be set based on the device type of the provisionee 310. In addition, some of the parameters can be common to the discovery phase. Nonetheless, the weights of these parameters can change between the two phases. For instance, parameters related to the list of computer networks can be weighed higher in the interrogation phase.

To illustrate the use of the above parameters, consider the scenario where the server 330 determines the following. The digital certificate indicates that the provisionee 310 is from a trusted manufacturer. The environmental data generated by the provisionee 310 matches the environmental data generated by the provisioner 320. The random data sent by the provisionee 310 matches the random data generated by the server 330. The other devices 340 indicate that the provisionee 310 was detected. And the confirmation data 362 indicates user input confirming the authorization. In this scenario, the server 330 generates the confidence score 332 to have a high value (e.g., close to if not equal to one-hundred percent).

In another scenario, the server 330 determines that the digital certificate indicates a manufacturer associated with fraudulent activities, the environmental data do not match, no random data is received from the provisionee 310, a small number or any of the other devices 340 detected the provisionee, and the confirmation data 362 indicates that no authorization is provided. In this scenario, the server 330 generates the confidence score 332 to have a low value (e.g., close to if not equal to zero percent).

In yet another scenario, the server 330 determines that the digital certificate indicates a trusted manufacturer, that the confirmation data 362 indicates user input confirming the authorization, and that a larger number if not all of the other devices 340 detected the provisionee 310. However, the environmental data do not match and the received data random data partially matches the random data generated by the server 330. In this scenario, the server 330 generates the confidence score 332 to have a medium value (e.g., close to seventy percent).

In addition, the user account 350 can store historical data about device connections to the secure network. The confidence score 332 can be generated based on the historical data. In particular, the historical data can indicate (e.g., based on a pattern recognition algorithm) a particular pattern for devices being added to the secure network, such as a typical time of day when the devices are added, a typical geographical location, typical network traffic before and/or after the addition, and the like. If the fourth authorization data 312 and/or the fifth authorization data 322 fits the pattern, the server 330 can increase the confidence score 332. In addition, the historical data can indicate a pattern of user confirmations when requested. If the pattern indicates that a user confirmation is expected given a certain confidence score, the user confirmation need no longer be requested in the interrogation phase.

Examples of the above parameters with weights are shown in Table 2 below. Although the weights are expressed in terms of low or high any weighting scheme may be employed such as a numerical scheme in which weights are assigned real numbers (e.g., a real number between zero and one hundred). In addition, although the various parameters are described, the server 330 may use only a subset of the parameters to generate the confidence score 332.

TABLE 2

| Parameter | Weight |
| --- | --- |
| RSSI (from provisionee and/or provisioner). Server can estimate distance between the two devices based on RSSI | Low |
| A time window after the purchase order, and whether provisionee was detected by provisioner within the time window | Low |
| List of networks detected by provisionee | High |
| List of networks detected by provisioner. Server can match with list sent from provisionee | Low |
| ISP as determined from Internet Protocol (IP) addresses | Low |
| Geo-location of provisionee | Low |
| Confirmation data indicating user input authorizing addition of provisionee to secure network | High |
| Environmental data | Low |
| Digital certificate | High |

Although FIGS. 2-3 illustrate that a provisionee (the provisionee 210 of FIG. 2 and the provisionee 310 of FIG. 3) and a provisioner (the provisioner 220 of FIG. 2 and the provisioner 320 of FIG. 3) are associated with a same user account, the embodiments of the present disclosure are not limited as such. Instead, the provisionee can be associated with a user account, where this user account may be managed by, for instance, a service provider that manages a confidence-based authorization process through a server (e.g., the server 230 of FIG. 2 and the server 330 of FIG. 3). In comparison, the provisioner can be associated with a different user account managed by the same or a different service provider (e.g., a third party).

In addition to setting the weights based on the device type as described in FIGS. 2-3, other features related to the confidence score can depend on the device type. For instance, rather than using weights (or where all the weights are the same), a penalty can be added to the confidence score depending on the device type. Additionally or alternatively, the thresholds to compare to the confidence score can be adjusted based on the device type.

Furthermore, the weights, penalty, thresholds can depend additionally or alternatively on factors other than the device type. For instance, one or more user identifiers can be used to define the weights, penalty, and/or thresholds. A user identifier can be associated with a user operating the provisionee and/or the provisioner. The same user identifier may, but need not, be detected as being associated with the provisionee and the provisioner. If one of the one or more user identifiers matches a user identifier from a trusted list, the weights and/or penalty can be adjusted such that the confidence score is increased and the thresholds can be decreased. Conversely, if one of the one or more user identifiers matches a user identifier from an untrusted list, the weights and/or penalty can be adjusted such that the confidence score is increased and the thresholds can be decreased. The trusted list and/or the untrusted list can be generated by the server based on historical data about device connections to secure networks and/or can be imported from other computer systems.

In a first illustrative example, the server detects that the user identifier associated with the provisionee is on the untrusted list. In this example, the server decreases the confidence score and/or increases the thresholds. In a second illustrative example, the server also detects that the user identifier associated with the provisioner is on the untrusted list. Accordingly, the server further decreases the confidence score and/or increases the thresholds. In a third illustrative example, the server detects the location(s) of the provisionee and/or the provisioner. The server also determines user identifiers associated within an area having a predefined size and containing the location(s). If a certain number (e.g., percentage) of such identifiers are on the untrusted list, the server decreases the confidence score and/or increases the thresholds.

Figure 4:
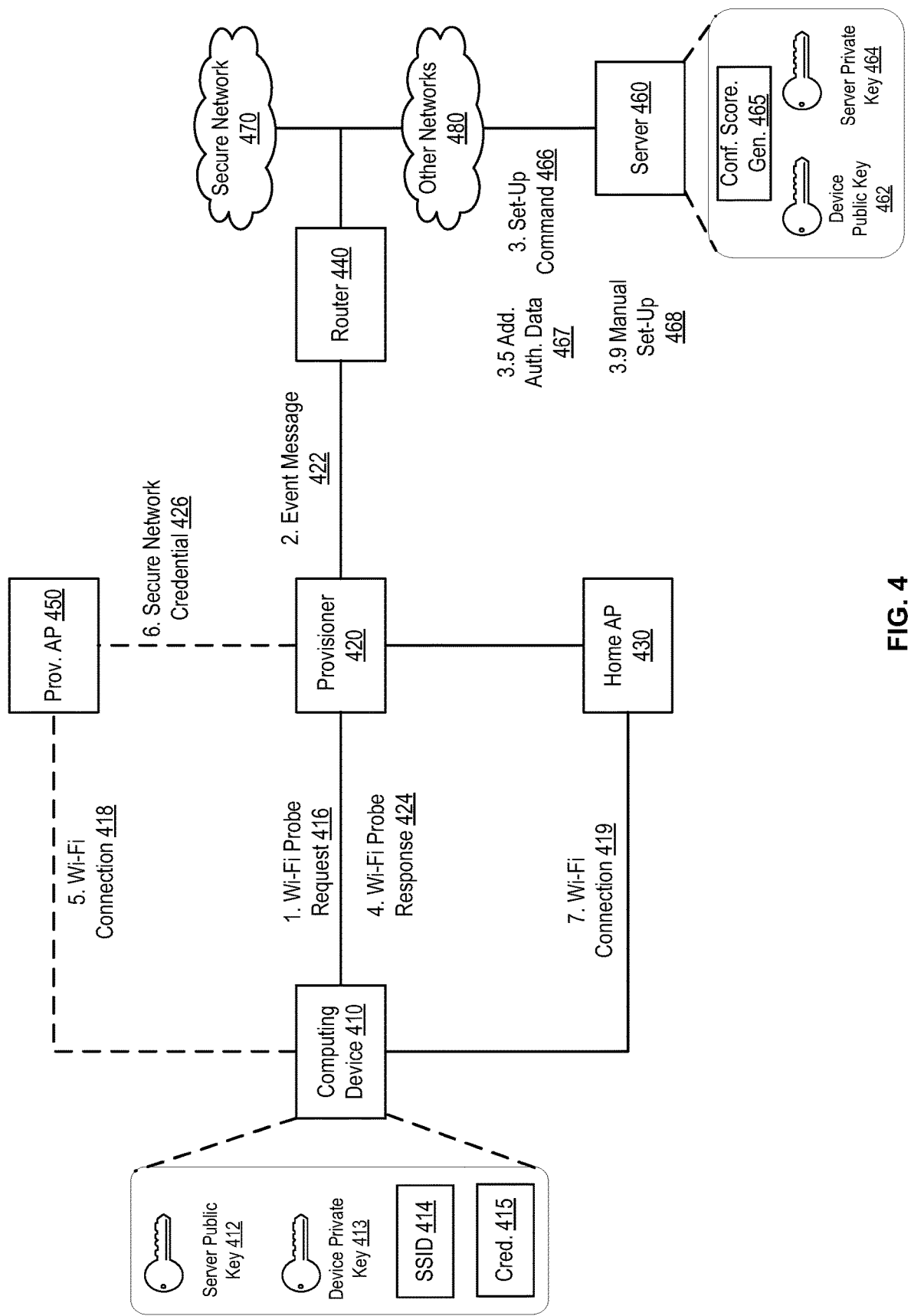
FIG. 4 illustrates an example of a system for connecting computing devices to computer networks, according to an embodiment of the present disclosure.

FIG. 4 illustrates an example of a system for connecting computing devices to computer networks, according to an embodiment of the present disclosure. As illustrated, the system includes a computing device 410, a provisioner 420, a home access point 430, a router 440, a provisioning access point 450, and a server 460. The provisioner 420, the home access point 430, and the router 440 belong to a secure computer network 470, such as a home network, that may include a number of other computing devices. The router 440 may connect the secure computer network 470 to other computer networks 480, including public networks such as the internet. The server 460 may be communicatively coupled with the secure network 470, including with the provisioner 420, via one or more of the other networks 480. For instance, a TLS channel exists between the provisioner 420 and the server 460. The computing device 410, the provisioner 420, and the server are examples of provisionee 110, the provisioner 140, and the server 130, respectively, of FIG. 1.

A user may desire to connect the computing device 410 to the secure computer network 470. To support the connection, the provisioner 420 sets up the provisioning access point 450 at least temporarily and specifically for the computing deice 410. By doing so, the computing device 410, the provisioning access point 450, and the provisioner 420 form a temporary computer network. This network may be a second secure computer network necessitating a credential (e.g., a passphrase for access thereto). The provisioner 420 also sends a credential for the secure computer network 470 to the computing device 410 over the provisioning access point 450. The computing device 410 then joins the secure computer network 470 by connecting to the home access point 430 based on the credential and disconnecting from the temporary computer network.

In an example, the computing device 410 stores a server public key 412 (e.g., a public key of the server 460) and a device private key 413 (e.g., a private key of the computing device 410). Upon a trigger event, the computing device 410 generates and stores an SSID 414 and a credential 415 for the temporary computer network based on the server public key 412 and the device private key 413. The trigger event can be a power on for the first time, a connection failure following a previous connection with the home access point 430, a command of the provisioner 420, or a time-based trigger (e.g., a schedule to rotate credentials). The type of the credential 415 can depend on the security protocol that the computing device supports 410. For WPA-Personal and/or WPA/WPA-PSK, the credential 415 includes a passphrase. For WPA-Enterprise, the credential 415 includes a passphrase and/or a certificate.

The computing device 410 also broadcasts a Wi-Fi probe request 416 that includes the SSID 414 and excludes the credential 415. Wi-Fi probe request 416 also includes authorization data as described in FIG. 2. The provisioner 420 receives and verifies whether the Wi-Fi probe request 416 is valid. If so, the provisioner generates an event message 422. Otherwise, the Wi-fi probe request 416 is ignored. The event message 422 includes the SSID and a device identifier of the computing device 410, such as the computing device's 410 MAC address. The event message 422 also includes the authorization data received from the computing device and authorization data added by the provisioner 420. The event message 422 is sent to the server 460 over the TLS channel.

The server 460 receives the event message 422 and determines whether the computing device 410 is authorized to join the secure computer network 470 (e.g., by determining a likelihood of the authorization). In particular, a confidence score generator 465 of the server 460 generates a confidence score based on the authorization data from the event message 422 and authorization data from other sources as described in FIG. 2. If the confidence score exceeds a second threshold, the server 460 transmits a set-up command 466 back through the other networks 480, the router 440, and to the provisioner 420. The set-up command 466 includes instructions for proceeding with the addition of the computing device 410 to the secure network without user input. If the first confidence score is below a first threshold, the server instructs the provisioner 420 (e.g., via a response sent through the other networks 480 and the router 440) to initiate a manual set-up 468. Generally, the manual set-up 468 necessitates user input to add the computing device 410 to the secure network 470. If the first confidence score is between the first threshold and the second threshold, the server 460 transmits a request for additional authorization data 467 through the other networks 480, the router 440, and to the provisioner 420 and other devices on the secure network 470. Upon receiving such data, the confidence score generator 465 updates the confidence score for comparison to the same pair or a different pair of thresholds. Based on this comparison, the server 460 can send the set-up command 466 or can instruct the provisioner 420 to initiate the manual set-up 468.

If the set-up command 466 is to be sent, the server 460 further processes the event message 422 and returns the set-up command 466 to the provisioner 420 over the TLS channel. Otherwise, the event message 422 is ignored. The processing includes determining the SSID from the event message 422 and generating a credential for the SSID. In an illustration, the server 460 uses a portion or all of the SSID, the device public key 462, and the server private key 464 to derive this credential and whether this credential is the same as the credential 415 generated and stored by the computing device 410. The set-up command 466 includes the SSID and the credential and is received by the provisioner 420.

In response, the provisioner 420 sets up the provisioning access point 450 to restrict access to the temporary computer network having the SSID and to require the credential for the access. The provisioner 420 also sends a Wi-Fi probe response 424 responding to the Wi-Fi probe request 416 and indicating that the provisioning access point 450 or, equivalently, the temporary computer network is available.

Upon receiving the Wi-Fi probe response 424, the computing device 410 performs a scan and identifies the temporary computer network. At that point, the computing device 410 presents the SSID and the credential 415 to the provisioning access point 450 and authentication is performed. Upon completion of the authentication, a Wi-Fi connection 418 is established between the computing device 410 and the provisioning access point 450. Hence, a Wi-Fi connection exists between the provisioner 420 and the computing device 410 via the provisioning access point 450.

At this point, the computing device 410 has been added to the temporary computer network. The provisioner 420 can restrict the activities of the computing device 410 within this computer network and restrict access of the computing device 410 to other networks including the secure computer network 470 and the other computer networks 480. For instance, the provisioner 420 may prevent the access of the computing device 410 to the secure computer network 470. In addition, the provisioner 420 may restrict (e.g., by using filters) the data exchange with the computing device 410 to exchanging relevant connection data for setting up a new Wi-Fi connection to the secure computer network 470 over the home access point. Alternatively, the provisioner 420 may provide full or partial access (e.g., also by using filters) of the computing device 410 to the other computer networks 480.

Furthermore, the provisioner 420 generates a credential specific to the computing device 410 and usable to connect to the secure computer network 470 (illustrated as a secure network credential 426). The relevant connection data can also include the SSID of the secure network 470 and one or more configuration parameters for the connection (e.g., IP address, default gateway, domain name system (DNS) configuration, etc.). The provisioner 420 sends the relevant connection data, including the secure network credential 426 to the computing device 410 via the provisioning access point 450. Based on a termination event, the provisioner 420 terminates the provisioning access point. The termination event can be the transmission of the relevant connection data, a detection that the computing device 410 disconnected from the temporary computer network, and/or a detection that the computing device 410 connected to the secure computer network 470.

The computing device 410 receives the relevant connection data and connects to the home access point 430 accordingly. For instance, the computing device 410 performs a scan and identifies the secure computer network 470. At that point, the computing device 410 presents the SSID of this network 470 and the secure network credential 426 to the home access point 430 and authentication is performed. Upon completion of the authentication, a Wi-Fi connection 419 is established between the computing device 410 and the home access point 430. The computing device 410 can also disconnect from the provisioning access point 450. At this point, the computing device 410 has joined the secure computer network 470. In addition, a Wi-Fi connection exists between the provisioner 420 and the computing device 410 via the home access point 430 and the provisioner can manage access of the computing device 410 to the other computer networks 480 based on any applicable restrictions.

Figure 5:
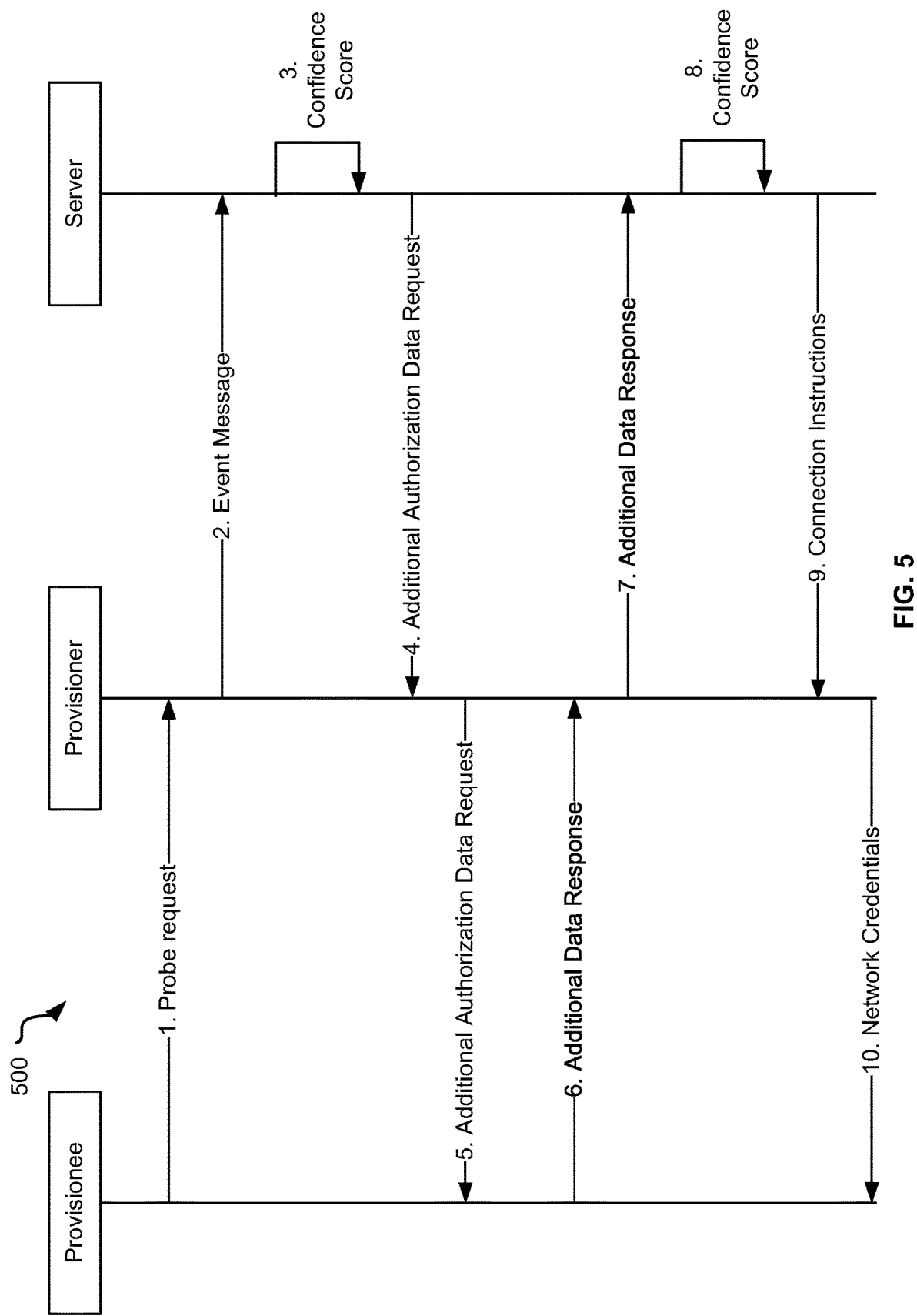
FIG. 5 illustrates an example of a sequence diagram for generating a confidence score to add a computing device to a secure computer network, according to an embodiment of the present disclosure.

FIG. 5 illustrates an example of a sequence diagram 500 for generating a confidence score to add a computing device (e.g., a provisionee) to a secure computer network, according to an embodiment of the present disclosure. The sequence diagram 500 includes multiple steps performed by the provisionee, a provisioner, and a server.

In a first step of the sequence diagram 500, the provisionee sends a probe request. For instance, the probe request is sent in a broadcast and includes first authorization data. The first authorization data includes a first set of parameters associated with the provisionee, similar to the first authorization data 212 of FIG. 2. The probe request may be received by multiple provisioners on the secure computer network.

In a second step of the sequence diagram 500, the provisioner sends an event message to the server in response to receiving the probe request. The event message is sent in a secure link, such as one using TLS. The event message includes the first authorization data and second authorization data. The second authorization data includes a second set of parameters associated with the provisioner, similar to the second authorization data 222 of FIG. 2. If the probe request was received by multiple provisioners on the secure computer network, each of such provisioners may send an event message to the server. In turn, the server may randomly select one of the provisioners to proceed with the processing. Alternatively, the selection may be based on some of the second authorization data. For instance, the provisioner associated with the largest RSSI can be selected. Or, if only one provisioner is associated with the same user account as the provisionee, that provisioner can be selected. Although the sequence diagram 500 illustrates the provisioner sending a single event that includes the first authorization data and the second authorization data, the provisioner may send two separate event messages, one for the first authorization data and one for the second authorization data.

In a third step of the sequence diagram 500, the server generates a confidence score based on the event message. For instance, for each parameter in the first set and second set, the server allocates an individual score according to the value of the parameter. The individual scores can be weighted, each weight can be set based on the device type of the identifier. The weighted individual scores are summed to generate the confidence score. In an example, in addition to the first authorization data and second authorization data, the server may also access third authorization data from other devices, some of which may be other provisioners, and remaining ones may not be devices on the secure network. The third authorization data includes a third set of parameters available from these devices and associated with the provisionee, provisioner, and/or user account, similar to the third authorization data 242 of FIG. 2.

In addition, if multiple event messages are received from multiple provisioners (e.g., no selection is performed in the second step), the server may generate confidence scores based on each of the event messages and may average the confidence scores to determine the confidence score.

In the third step, the server relies on the confidence score to determine whether additional authorization data is needed (in which case a fourth step of the sequence diagram 500 is triggered), whether the provisionee is determined to be authorized to join the secure network with a high likelihood (e.g., based on the confidence score exceeding the relevant threshold; and in which case a ninth step of the sequence diagram 500 is triggered), or whether a manual set-up should be triggered to add the provisionee to the secure network (in which the sequence diagram ends). In particular, the confidence score can be compared to a set of thresholds, where some or all of the thresholds can be set based on the device type of the provisionee.

In the fourth step of the sequence diagram 500, the server sends a request to the provisioner for the additional authorization data. The request can include instructions specifying specific type of authorization data to receive from the provisioner and from the provisionee. Alternatively, the request can include instructions to send the authorization data and each of the provisioner and provisionee can be pre-configured with program code to determine the type of authorization data to send. Here also, multiple provisioners may send responses including additional authorization data to the server. Although the sequence diagram 500 illustrates the server sending a request to a provisioner, the server may send similar requests to multiple provisioners, including some or all of the provisioners from which event messages may have been received.

In a fifth step of the sequence diagram 500, the provisioner sends a request to the provisionee for additional authorization data. The request can include instructions specifying specific types of authorization data to receive from the provisionee. Alternatively, the request can include instructions to send the authorization data and the provisionee can be pre-configured with program code to determine the type of authorization data to send.

In a sixth step of the sequence diagram 500, the provisionee sends a response to the provisioner. The response includes fourth additional data. The fourth authorization data includes a fourth set of parameters associated with the provisioner, similarly to the fourth authorization data 312 of FIG. 3.

In a seventh step of the sequence diagram 500, the provisioner sends a response to the server. The response includes the fourth authorization data and fifth authorization data. The fifth authorization data includes a fifth set of parameters associated with the provisioner, similar to the fifth authorization data 322 of FIG. 3. Although the sequence diagram 500 illustrates the provisioner sending a single response that includes the fourth authorization data and the fifth authorization data, the provisioner may send two separate responses, one for the fourth authorization data and one for the fifth authorization data. Here also, multiple provisioners may send responses including additional authorization data to the server.

In an eight step of the sequence diagram 500, the server generates a confidence score based on the event message. For instance, for each parameter in the fourth set and fifth set, the server allocates an individual score according to the value of the parameter. The individual scores can be weighted, each weight can be set based on the device type of the identifier. The weighted individual scores are summed to generate the confidence score. In an example, in addition to the fourth authorization data and fifth authorization data, the server may also access sixth authorization data from other devices on the secure network, such as some or all of the other provisioners. The sixth authorization data includes a sixth set of parameters available from such device(s) and associated with the provisionee, provisioner, and/or the other device(s), similar to the sixth authorization data 342 of FIG. 3. Likewise, the server can receive confirmation data from one of the provisioners or from a separate user device associated with the user account of the provisioner.

In addition, if multiple responses are received from multiple provisioners (e.g., no selection is performed in the second step), the server may generate confidence scores based on each of the responses and may average the confidence scores to determine the confidence score.

In the eighth step, the server relies on the confidence score to determine whether additional authorization data is needed (in which case the fourth step of the sequence diagram can be repeated), whether the provisionee is determined to be authorized to join the secure network (in which case the ninth step of the sequence diagram 500 is triggered), or whether a manual set-up should be triggered to add the provisionee to the secure network (in which the sequence diagram ends). In particular, the confidence score can be compared to a set of thresholds, where some or all of the thresholds can be set based on the device type of the provisionee.

In the ninth step of the sequence diagram 500, the server sends connection instructions to the provisioner. Generally, the connection instructions instruct the provisioner to facilitate the access of the provisionee to the secure network without the need of user input. In an example, the connection instructions include an SSID and a passphrase of the secure network. In another example, the connection instructions request the provisioner to establish a temporary network, similar to the approach described in FIG. 4.

In a tenth step of the sequence diagram 500, the provisioner sends network credentials to the provisionee according to the connection instructions. For instance, the provisioner sends the SSID and the passphrase of the secure network or an SSID of the temporary network similar to the approach describe din FIG. 4.

FIGS. 6-10 illustrate example flows for connecting a provisionee (e.g., a first device) to a computer network by using, in part, a provisioner (e.g., a second device that may, but need not be, a device of the secure computer network). Instructions for performing the operations can be stored as computer-readable instructions on one or more non-transitory computer-readable media of a computer system (e.g., any of the servers described herein above). As stored, the instructions represent programmable modules that include code executable by one or more processors of the computer system. The execution of such instructions causes the computer system to perform the specific operations shown in the corresponding figure and described herein. Each programmable module in combination with the respective processor(s) represents a means for performing a respective operation(s). While the operations are illustrated in a particular order, it should be understood that no particular order is necessary and that one or more operations may be omitted, skipped, and/or reordered.

Figure 6:
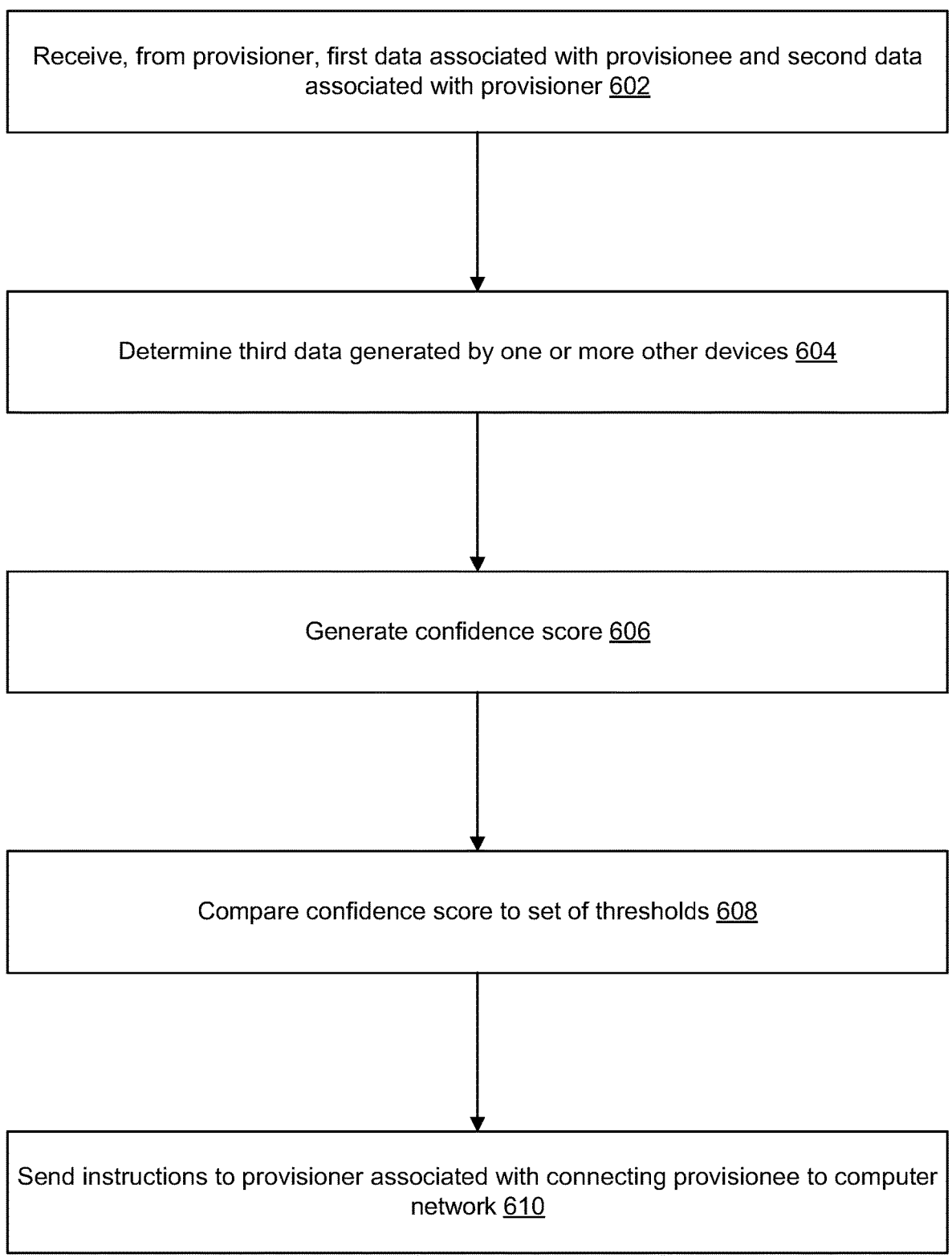
FIG. 6 illustrates an example flow for a confidence-based authorization to connect a provisionee to a computer network, according to an embodiment of the present disclosure.

FIG. 6 illustrates an example flow for a confidence-based authorization to connect the provisionee to the computer network, according to an embodiment of the present disclosure. In an example, the flow starts at operation 602, where the computer system receives, from the provisioner, first data associated with the provisionee and second data associated with the provisioner. For instance, the first data and the second data can correspond to the first authorization data 212 and the second authorization data 222, respectively, of FIG. 2 when the provisioning of the connection to the computer network is in a discovery phase. In another illustration, the first data and the second data can correspond to the fourth authorization data 312 and the fifth authorization data 322, respectively, of FIG. 3 when the provisioning of the connection to the computer network is in an interrogation phase.

At operation 604, the computer system determines third data generated by one or more devices. In an example, the third data can be received in a pull mechanism or a push mechanism from the one or more devices. Additionally or alternatively, the third data can be accessed from a user account associated with the provisioner. The third data can correspond to the third authorization data 242 of FIG. 2 when the provisioning of the connection to the computer network is in the discovery phase. In another illustration, the third data can correspond to the sixth authorization data 342 and/or the confirmation data 362 of FIG. 3 when the provisioning of the connection to the computer network is in the interrogation phase.

At operation 606, the computer system generates a confidence score based on the first data, the second data, and the third data. In an example, each of the data includes a set of parameters. Each of the parameters is associated with a weight. The weight can be set on a device type of the provisionee and/or on whether the provisioning of the connection to the computer network is in the discovery phase or the interrogation phase. The computer system can generate the score by computing individual scores of the parameters and summing the individual scores based on the weights.

At operation 608, the computer system compares the confidence score to a set of thresholds. In an example, the number of the thresholds (e.g., the size of the set) and the value(s) of the threshold(s) can be set based on the device type of the provisionee and/or on whether the provisioning of the connection to the computer network is in the discovery phase or the interrogation phase. For instance, two thresholds can be set in the discovery phase, and a single threshold larger than the two thresholds can be set in the interrogation phase. The confidence score is compared to the relevant threshold(s). If the comparison indicates a low likelihood of a user authorization to add the provisionee to the computer network, a manual set-up process can be triggered next. If the comparison indicates a high likelihood of the user authorization, the provisioner can be instructed to facilitate the automatic connection of the provisionee to the computer network without any additional user input. Otherwise, the computer system may collect additional data to update the confidence score or may trigger the manual set-up process.

At operation 610, the computer system sends instructions to the provisioner, where the instructions are associated with connecting the provisionee to the computer network. In an example, and based on an outcome of the comparison, the computer system instructs the provisionee to trigger the automatic connection, the manual process, and send the additional data. As explained herein above, the provisioner need not be the same as the device that sent the first data and the second data to the computer system. Instead, the provisioner instructed at operation 610 can be a different device of the computer network or another device of a different computer network.

Figure 7:
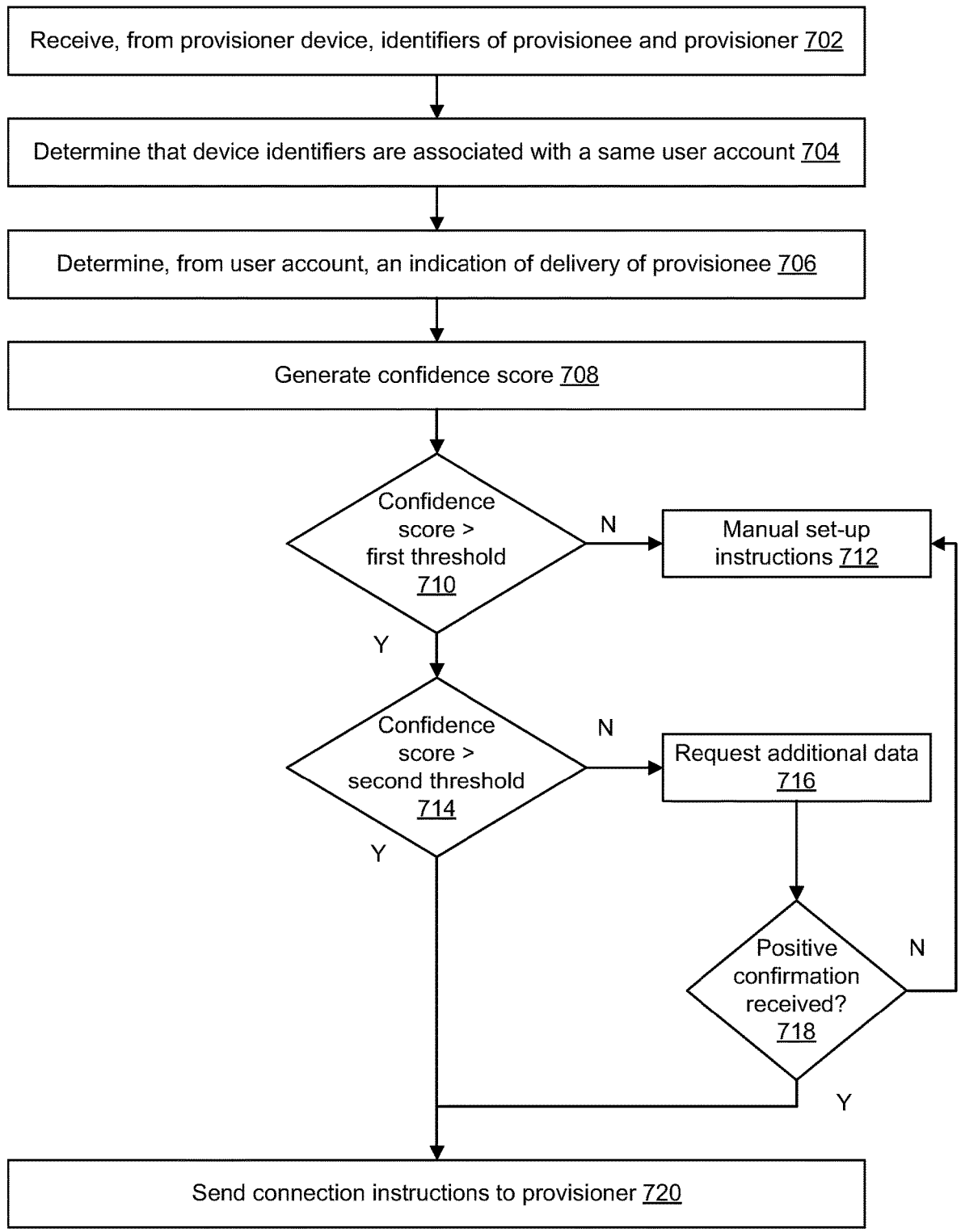
FIG. 7 illustrates an example flow for determining and using a confidence score in a discovery phase, according to an embodiment of the present disclosure.

FIG. 7 illustrates an example flow for determining and using a confidence score in a discovery phase, according to an embodiment of the present disclosure. In an example, the flow starts at operation 702, where the computer system receives, from the provisioner, a device identifier of the provisionee and a device identifier of the provisioner. Of course, other data can also be received, such as any parameters of the first authorization data 212 and the second authorization data 222 of FIG. 2.

At operation 704, the computer system determines that the device identifiers are associated with a same user account. In an example, the computer system uses the device identifier of one of the devices to determine the user account and checks whether the user account stores the identifier of the other device.

At operation 706, the computer system determines, from the user account, an indication of a completion of a delivery of the provisionee. In an example, the indication is stored in the user account in response to receiving a delivery notification from a delivery system. The user account may also store timing data about the completion and the computer system can determine that the completion occurred within a predefined time window (e.g., within the last thirty days).

The user account may also indicate that the delivery was to a location (e.g., area or address) that contains the provisioner.

At operation 708, the computer system generates a confidence score. For example, the confidence score is computed based on the two devices belonging to the same user account, the completion of the delivery occurring within the last thirty days, and the provisioner being delivered to the location associated with the provisioner. Of course other authorization data can be used in computing the confidence score.

At operation 710, the computer system compares the confidence score to a first threshold. In an example, the first threshold is predefined based on the device type of the provisionee. If the confidence score is smaller than the first threshold, operation 712 follows operation 710. Otherwise, operation 714 is performed.

At operation 712, the computer system sends a response to the provisioner or to another device associated with the user account (e.g., a smartphone) to initiate the set-up process. In particular, at this operation, the confidence score indicates a low likelihood of the user authorization.

At operation 714, the computer system compares the confidence score to a second threshold. In an example, the second threshold is predefined based on the device type of the provisionee and is larger than the first threshold. If the confidence score is smaller than the second threshold, operation 716 follows operation 714. Otherwise, operation 720 is performed.

At operation 716, the computer system sends a response to the provisioner or to the other device to request a user confirmation about the provisioning of the connection. In particular, at this operation, the confidence score indicates that the likelihood of the user authorization is not high enough to proceed with the automatic provisioning. Accordingly, the user confirmation is requested.

At operation 718, the computer system determines whether positive confirmation data is received. The positive conformation data indicates that the user authorization exists. If such data is received, operation 720 follows operation 718. If no positive confirmation data is received within a time out period (e.g., a time period defined relative to when the response was sent and having a predefined length), or if negative confirmation data is received, the automatic provisioning may not proceed forward. In this case, the operation 712 follows operation 718.

At operation 720, the computer system sends a response to the provisioner, where the response includes instructions to perform the automatic provisioning. Here, the confidence score (or the received confirmation data) indicates a high likelihood that the user authorization exists.

Figure 8:
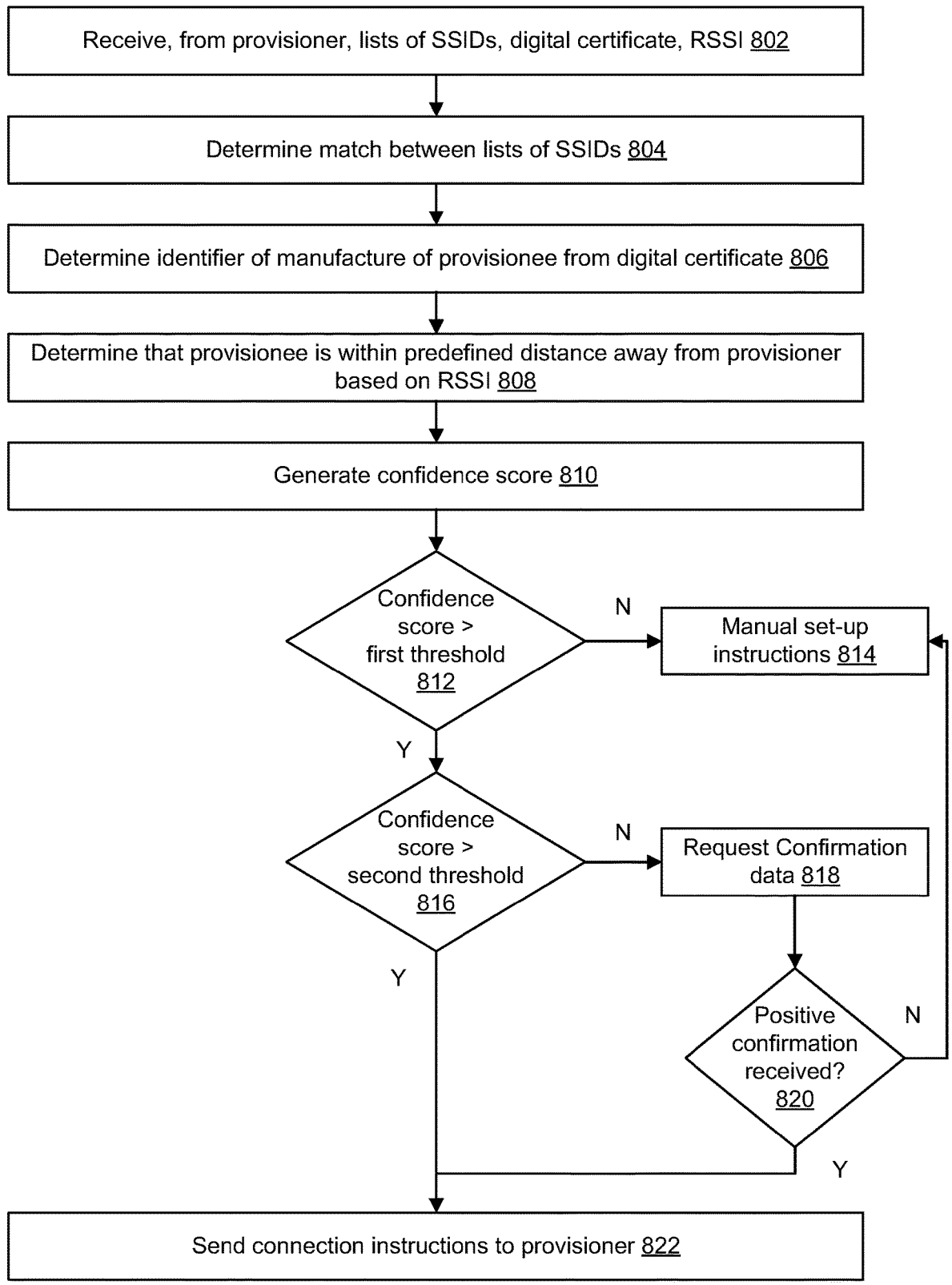
FIG. 8 illustrates an example flow for determining and using a confidence score in an interrogation phase, according to an embodiment of the present disclosure.

FIG. 8 illustrates an example flow for determining and using a confidence score in an interrogation phase, according to an embodiment of the present disclosure. In an example, the flow starts at operation 802, where the computer system receives, from the provisioner, a first list of SSIDs detected by the provisionee, a second list of SSIDs detected by the provisioner, a digital certificate of the provisionee, and an RSSI of a signal sent from the provisionee to the provisioner (or vice versa) over the data link. Of course, other data can also be received, such as any parameters of the fourth authorization data 312, the fifth authorization data 322, and/or the sixth authorization data 342 of FIG. 3.

At operation 804, the computer system determines that a match between the first list and the second list. In an example, the match need not be complete. For instance, if a certain number of SSIDs are the same between the two lists and that number exceeds a predefined threshold, the computer system declares an SSID match.

At operation 806, the computer system determines, from the digital certificate, and an identifier of a manufacturer of the provisionee. The computer system compares the identifier to a predefined list of manufacturer identifiers (e.g., a trusted or approved list of manufacturers). If the identifier matches one of the listed manufacturer identifiers, the computer system declares a manufacturer match.

At operation 808, the computer system determines that the provisionee is within a predefined distance away from the provisioner based on the RSSI. In an example, the value of the RSSI indicates a distance between the two devices. The computer system compares this distance to the predefined distance. If the distance is smaller than the predefined distance, the computer system declares that the provisionee is within the predefined distance.

At operation 810, the computer system generates a confidence score. For example, the confidence score is computed based on SSID match, the manufacturer match, the provisionee being within the predefined distance. Of course other authorization data can be used in computing the confidence score.

At operation 812, the computer system compares the confidence score to a first threshold. In an example, the first threshold is predefined based on the device type of the provisionee. If the confidence score is smaller than the first threshold, operation 814 follows operation 812. Otherwise, operation 816 is performed.

At operation 814, the computer system sends a response to the provisioner or to another device associated with the user account (e.g., a smartphone) to initiate the set-up process. In particular, at this operation, the confidence score indicates a low likelihood of the user authorization.

At operation 816, the computer system the compares the confidence score to a second threshold. In an example, the second threshold is predefined based on the device type of the provisionee and is larger than the first threshold. If the confidence score is smaller than the second threshold, operation 818 follows operation 816. Otherwise, operation 822 is performed.

At operation 818, the computer system sends a response to the provisioner or to the other device to request a user confirmation about the provisioning of the connection. In particular, at this operation, the confidence score indicates that the likelihood of the user authorization is not high enough to proceed with the automatic provisioning. Accordingly, the user confirmation is requested. If confirmation data is received and indicates that the user authorization exists, operation 820 can follow operation 818 as indicated with the dashed arrow.

At operation 820, the computer system determines whether positive confirmation data is received. The positive conformation data indicates that the user authorization exists. If such data is received, operation 822 follows operation 820. If no positive confirmation data is received within a time out period (e.g., a time period defined relative to when the response was and having a predefined length), or if negative confirmation data is received, the automatic provisioning may not proceed forward. In this case, the operation 814 follows operation 820.

At operation 822, the computer system sends a response to the provisioner, where the response includes instructions to perform the automatic provisioning. Here, the confidence score (or the received confirmation data) indicates a high likelihood that the user authorization exists.

Figure 9:
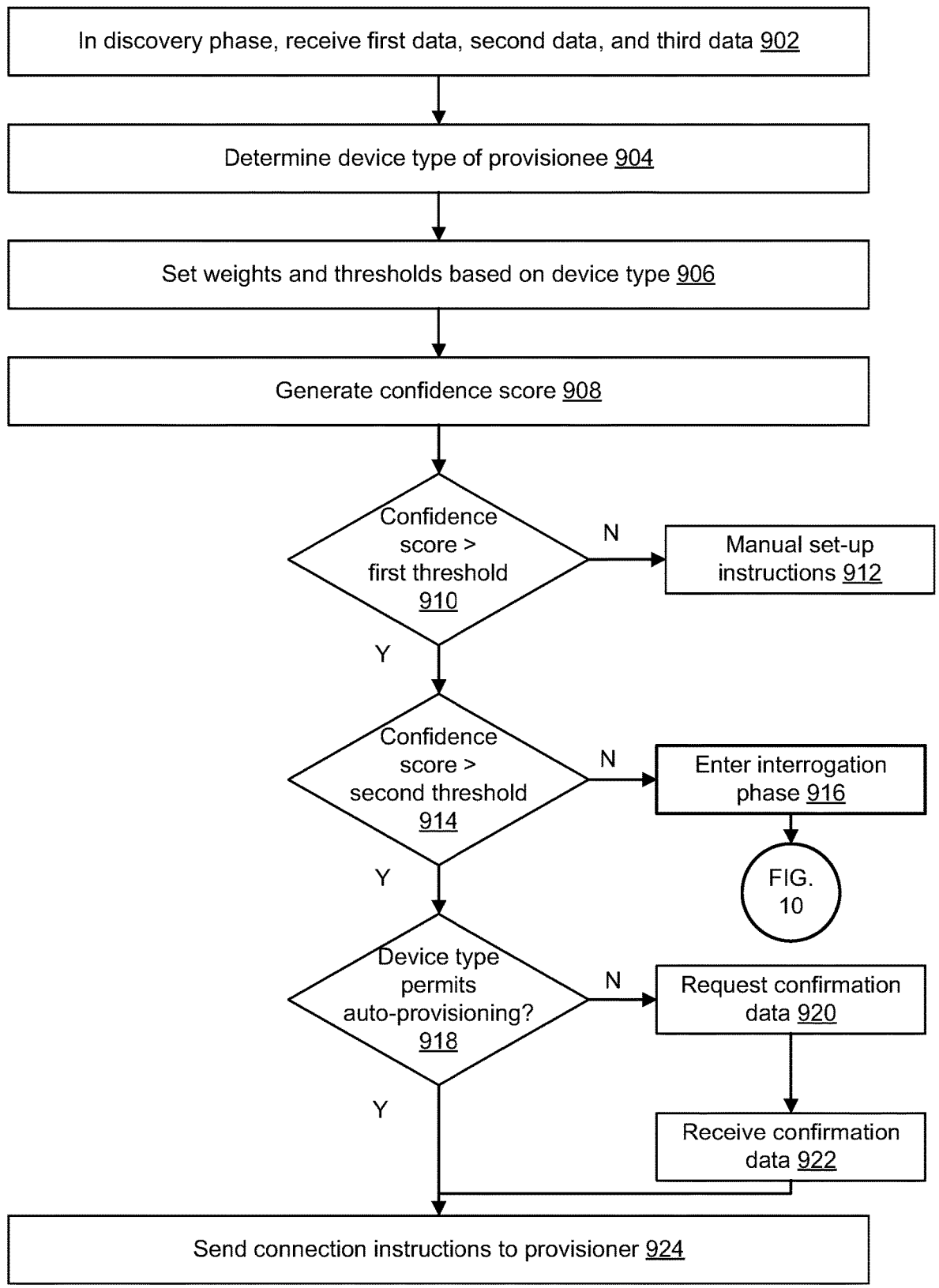
FIG. 9 illustrates an example flow for determining and using a confidence score and a user confirmation in a discovery phase, according to an embodiment of the present disclosure.

FIG. 9 illustrates an example flow for determining and using a confidence score and a user confirmation in the discovery phase, according to an embodiment of the present disclosure. In an example, the flow starts at operation 902, where the computer system receives first data associated with the provisionee, second data associated with the provisioner, and third data associated with at least one of: the provisionee, the provisioner, the user account associated with the provisioner, or the computer network and generated by one or more devices other than the provisionee or the provisioner. The first data, the second data, and the third data can correspond to the first authorization data 212, the second authorization data 222, and the third authorization data 242, respectively, of FIG. 2.

At operation 904, the computer system determines a device type of the provisionee. In an example, the device type is stored in the user account or identified from the digital certificate of the provisionee.

At operation 906, the computer system sets weights for the different parameters included in the first data, the second data, and the third data, based on the device type. The computer system also sets thresholds based on the device type. For instance, the computer system uses the device type in a look-up to a data store that stores predefined values of the weights and predefined values of the thresholds in association with device types.

At operation 908, the computer system generates a confidence score. For example, the confidence score is computed based on a weighted sum of individual scores corresponding to the different parameters.

At operation 910, the computer system compares the confidence score to a first threshold. In an example, the first threshold is one of the thresholds set at operation 906. If the confidence score is smaller than the first threshold, operation 912 follows operation 910. Otherwise, operation 914 is performed.

At operation 912, the computer system sends a response to the provisioner or to another device associated with the user account (e.g., a smartphone) to initiate the set-up process. In particular, at this operation, the confidence score indicates a low likelihood of the user authorization.

At operation 914, the computer system the compares the confidence score to a second threshold. In an example, the second threshold is one of the thresholds set at operation 906 and is larger than the first threshold. If the confidence score is smaller than the second threshold, operation 916 follows operation 914. Otherwise, operation 918 is performed.

At operation 916, the computer system enters the interrogation phase. For instance, the computer system sends a request to the provisioner for additional data, where the request corresponds to a start of the interrogation phase. Operation 1002 of the flow of FIG. 10 can follow operation 916.

At operation 918, the computer system determines whether the device type permits the automatic provisioning. In an example, two-way communication devices, surveillance devices, and/or other types of devices may necessitate a user confirmation before being connected to the computer network. The computer system uses the device type in a look-up to a data store that stores permission for the automatic provisioning in association with device types. If the result of the look-up indicates that the user confirmation is needed, operation 920 follows operation 918. Otherwise, operation 924 is performed.

At operation 920, the computer system sends a response to the provisioner or to the other device to request a user confirmation about the provisioning of the connection. In particular, at this operation, although the confidence score indicates that the likelihood of the user authorization is high, the device type necessitates the user confirmation.

At operation 922, the computer system receives the confirmation data from the provisioner or the other device. The confirmation data indicates a positive user confirmation to proceed with the automatic provisioning. However, if no positive user confirmation is received within a time out period or if a negative user confirmation is received, the automatic provisioning may not proceed forward. In this case, the computer system may, for instance, send instructions to the provisioner for initiating the manual set-up.

At operation 924, the computer system sends a response to the provisioner, where the response includes instructions to perform the automatic provisioning. Here, the confidence score (or the received confirmation data) indicates a high likelihood that the user authorization exists.

Figure 10:
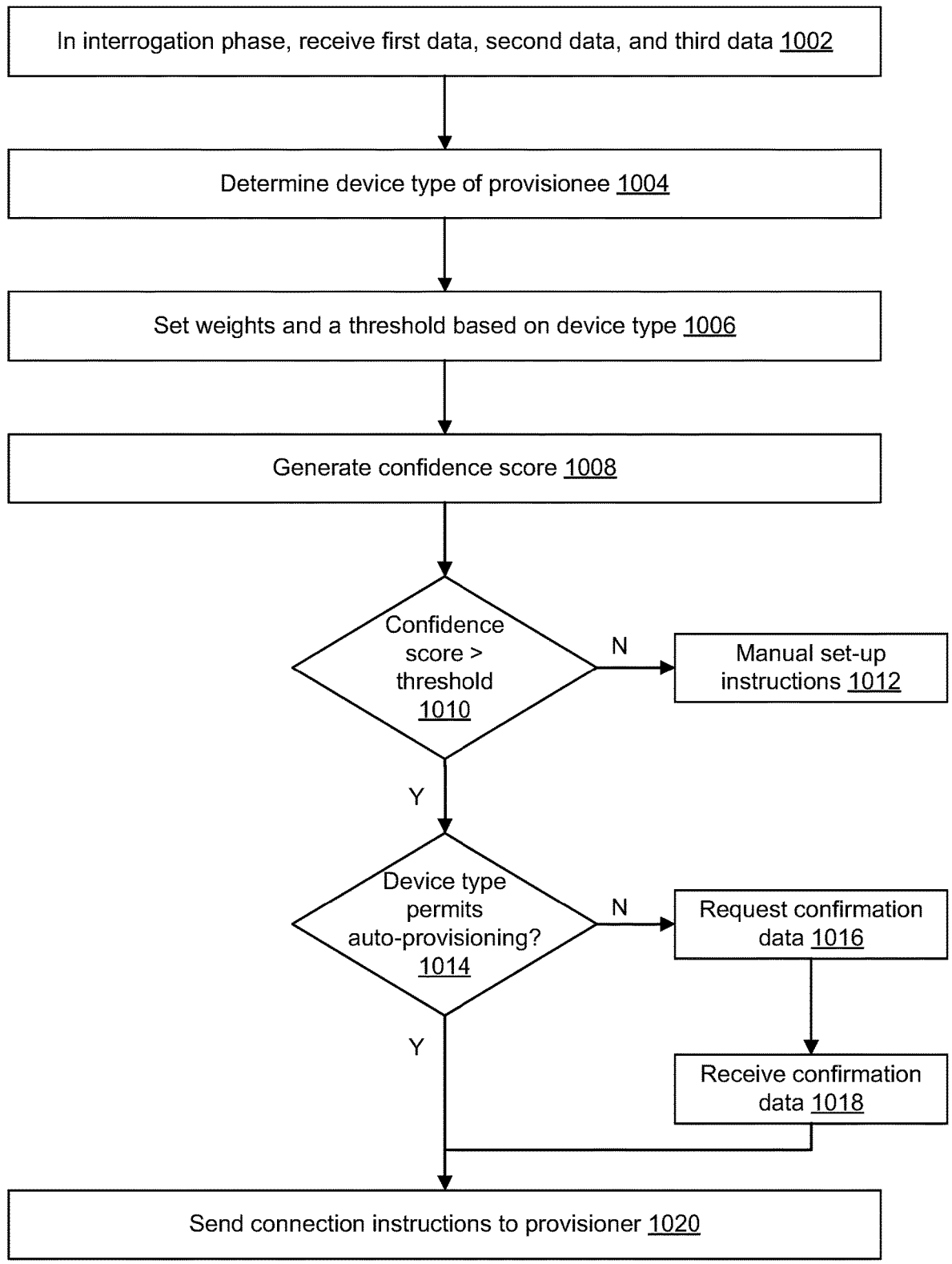
FIG. 10 illustrates an example flow for determining and using a confidence score and a user confirmation in an interrogation phase, according to an embodiment of the present disclosure.

FIG. 10 illustrates an example flow for determining and using a confidence score and a user confirmation in the interrogation phase, according to an embodiment of the present disclosure. In an example, the flow starts at operation 1002, where the computer system receives first data associated with the provisionee, second data associated with the provisioner, and third data associated with at least one of: the provisionee, the provisioner, the user account associated with the provisioner, or the computer network and generated by one or more devices other than the provisionee or the provisioner. The first data, the second data, and the third data can correspond to the fourth authorization data 312, the fifth authorization data 322, and the sixth authorization data 342, respectively, of FIG. 3.

At operation 1004, the computer system determines a device type of the provisionee. In an example, the device type is stored in the user account or identified from the digital certificate of the provisionee.

At operation 1006, the computer system sets weights for the different parameters included in the first data, the second data, and the third data, based on the device type. The computer system also sets a threshold based on the device type. For instance, the computer system uses the device type in a look-up to a data store that stores predefined values of the weights and predefined values of the thresholds in association with device types.

At operation 1008, the computer system generates a confidence score. For example, the confidence score is computed based on a weighted sum of individual scores corresponding to the different parameters.

At operation 1010, the computer system compares the confidence score to the threshold. If the confidence score is smaller than the threshold, operation 1012 follows operation 1010. Otherwise, operation 1014 is performed.

At operation 1012, the computer system sends a response to the provisioner or to another device associated with the user account (e.g., a smartphone) to initiate the set-up process. In particular, at this operation, the confidence score indicates a low likelihood of the user authorization.

At operation 1014, the computer system determines whether the device type permits the automatic provisioning. In an example, two-way communication devices, surveillance devices, and/or other types of devices may necessitate a user confirmation before being connected to the computer network. The computer system uses the device type in a look-up to a data store that stores permission for the automatic provisioning in association with device types. If the result of the look-up indicates that the user confirmation is needed, operation 1016 follows operation 1014. Otherwise, operation 1020 is performed.

At operation 1016, the computer system sends a response to the provisioner or to the other device to request a user confirmation about the provisioning of the connection. In particular, at this operation, although the confidence score indicates that the likelihood of the user authorization is high, the device type necessitates the user confirmation.

At operation 1018, the computer system receives the confirmation data from the provisioner or the other device. The confirmation data indicates a positive user confirmation to proceed with the automatic provisioning. However, if no positive user confirmation is received within a time out period or if a negative user confirmation is received, the automatic provisioning may not proceed forward. In this case, the computer system may, for instance, send instructions to the provisioner for initiating the manual set-up.

At operation 1020, the computer system sends a response to the provisioner, where the response includes instructions to perform the automatic provisioning. Here, the confidence score (or the received confirmation data) indicates a high likelihood that the user authorization exists.

Figure 11:
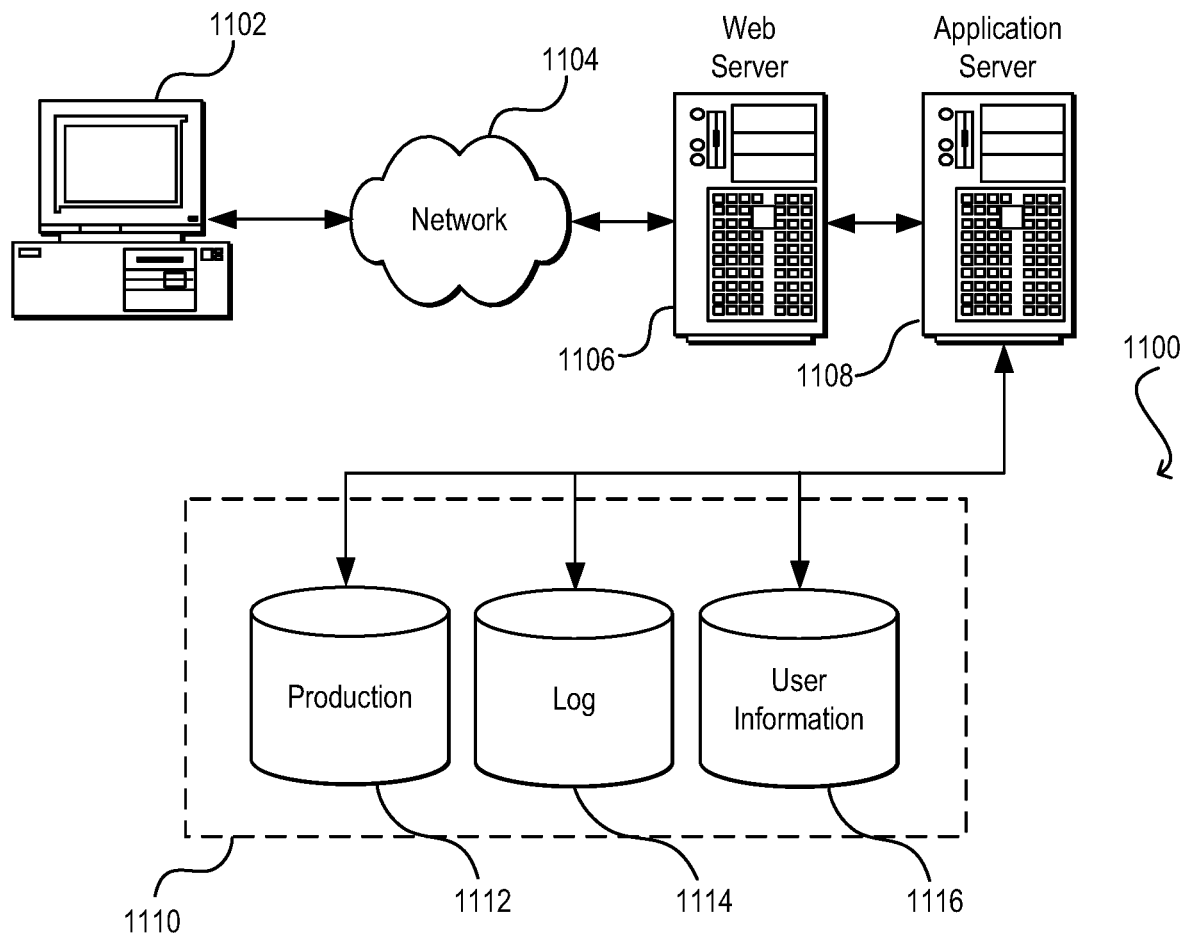
FIG. 11 illustrates a computer architecture diagram showing an example computer architecture, according to an embodiment of the present disclosure.

FIG. 11 illustrates a computer architecture diagram showing an example computer architecture, according to an embodiment of the present disclosure. This architecture may be used to implement some or all of the systems described herein.

The computer 1100 includes a baseboard 1102, or "motherboard," which is a printed circuit board to which a multitude of components or devices may be connected by way of a system bus or other electrical communication paths. In one illustrative embodiment, one or more central processing units ("CPUs") 1104 operate in conjunction with a chipset 1106. The CPUs 1104 may be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 may provide an interface to a random access memory ("RAM") 1108, used as the main memory in the computer 1100. The chipset 1106 may further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM may also store other software components necessary for the operation of the computer 1100 in accordance with the embodiments described herein.

The computer 1100 may operate in a networked environment using logical connections to remote computing devices and computer systems through a network, such as the local area network 1120. The chipset 1106 may include functionality for providing network connectivity through a NIC 1112, such as a gigabit Ethernet adapter. The NIC 1112 is capable of connecting the computer 1100 to other computing devices over the network 1120. It should be appreciated that multiple NICs 1112 may be present in the computer 1100, connecting the computer to other types of networks and remote computer systems.

The computer 1100 may be connected to a mass storage device 1118 that provides non-volatile storage for the computer. The mass storage device 1118 may store system programs, application programs, other program modules, and data, which have been described in greater detail herein. The mass storage device 1118 may be connected to the computer 1100 through a storage controller 1114 connected to the chipset 1106. The mass storage device 1118 may consist of one or more physical storage units. The storage controller 1114 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 may store data on the mass storage device 1118 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1118 is characterized as primary or secondary storage, and the like.

For example, the computer 1100 may store information to the mass storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 may further read information from the mass storage device 1118 by detecting the physical states or characteristics of one or more particular locations within the physical storage units.

In addition to the mass storage device 1118 described above, the computer 1100 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1100.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1118 may store an operating system 1130 utilized to control the operation of the computer 1100. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1118 may store other system or application programs and data utilized by the computer 1100. The mass storage device 1118 might also store other programs and data not specifically identified herein.

In one embodiment, the mass storage device 1118 or other computer-readable storage media is encoded with computer-executable instructions which, when loaded into the computer 1100, transforms the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various routines described above. The computer 1100 might also include computer-readable storage media for performing any of the other computer-implemented operations described herein.

The computer 1100 may also include one or more input/output controllers 1116 for receiving and processing input from a number of input devices, such as a keyboard, a mouse, a touchpad, a touch screen, an electronic stylus, or other type of input device. Similarly, the input/output controller 1116 may provide output to a display, such as a computer monitor, a flat-panel display, a digital projector, a printer, a plotter, or other type of output device. It will be appreciated that the computer 1100 may not include all of the components shown in FIG. 11, may include other components that are not explicitly shown in FIG. 11, or may utilize an architecture completely different than that shown in FIG. 11. It should also be appreciated that many computers, such as the computer 1100, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method by a computer system, the method comprising:
   receiving, from a second device of a secure local access network (LAN), a first device identifier of a first device and a second device identifier of the second device, the first device not connected to the secure LAN, the first device identifier and the second device identifier received based on a data link between the first device and the second device;
   determining that the first device identifier and the second device identifier are associated with a user account;
   determining, from the user account, an indication of a delivery of the first device within a predefined time window;
   generating a first confidence score indicating a likelihood of authorization to connect the first device to the secure LAN;
   determining that the first confidence score falls between a first predefined threshold and a second predefined threshold;
   sending, to the second device, a request for a first list of service set identifiers (SSIDs) of LANs detected by the first device, a digital certificate of the first device, a second list of SSIDs of LANs detected by the second device, and a received signal strength indicator (RSSI) associated with the data link;
   receiving, from the second device, the first list, the digital certificate, the second list, and the RSSI;
   generating a second confidence score indicating the likelihood of the user authorization, the second confidence score generated based on a similarity between the first list and the second list, the RSSI indicating that the first device is within a predefined distance away from the second device, and an identifier from the digital certificate of a manufacturer of the first device;
   determining that the second confidence score exceeds a third predefined threshold; and
   sending, to the second device, instructions associated with connecting the first device to the secure LAN.

2. The method of claim 1, further comprising:
   receiving, from the second device, a third device identifier of a third device, the third device not connected to the secure LAN;
   determining a third confidence score indicating a likelihood of authorization to connect the third device to the secure LAN;
   determining that the third confidence score falls between the first predefined threshold and the second predefined threshold or exceeds the third predefined threshold; and
   sending, based on a device type of the third device, to the second device or to another device associated with the user account, a request for a user confirmation of authorization to connect the third device to the secure LAN.

3. The method of claim 1, further comprising:
   receiving, from the second device, a third device identifier of a third device, the third device not connected to the secure LAN;
   determining a third confidence score indicating a likelihood of authorization to connect the third device to the secure LAN;
   determining that the third confidence score is smaller than the first predefined threshold and the second predefined threshold; and
   sending, to the second device or to another device associated with the user account, a request associated with triggering a manual set-up process to connect the third device to the secure LAN.

4. One or more non-transitory computer-readable storage media storing instructions that, upon execution by one or more processors of a system, cause the system to perform operations comprising:

receiving, from a second device, first data associated with a first device and second data associated with the second device, the first device not connected to a computer network;

determining third data generated by one or more devices other than the first device and the second device, the third data associated with at least one of: the first device, the second device, a user account associated with the second device, or the computer network;

generating, based on the first data, the second data, and the third data, a confidence score indicating a likelihood of authorization to connect the first device to the computer network; and sending, based on the confidence score, instructions associated with connecting the first device to the computer network.

5. The one or more non-transitory computer-readable storage media of claim 4, wherein the operations further comprise:

determining at least one of: (i) the user account is associated with a first device identifier of the first device and with a second device identifier of the second device, or (ii) that a completion of a delivery of the first device occurred within a predefined time window, wherein generating the confidence score is further based on the at least one of: (i) the user account being associated with the first device identifier and the second device identifier, or (ii) the completion occurred within the predefined time window;

determining that the confidence score falls between two predefined thresholds; and sending, to the second device, a request for additional data associated with at least one of the first device or the second device.

6. The one or more non-transitory computer-readable storage media of claim 5, wherein the operations further comprise:

receiving, from the second device, the additional data, wherein the additional data comprises at least one of: a digital certificate of the first device or a list of network identifiers of computer networks detected by the first device; and generating a second confidence score based on at least one of: an identifier of a manufacturer from the digital certificate or the list of network identifiers, wherein sending the instructions is further based on a determination that the second confidence score exceeds a predefined threshold, and wherein the instructions are sent to the second device or to another device on the computer network.

7. The one or more non-transitory computer-readable storage media of claim 4, wherein the operations further comprise:

determining that the confidence score exceeds a predefined threshold;

determining a device type of the first device; and sending, to the second device or to another device, a request for a user confirmation of the authorization to connect the first device to the computer network, the second device and the other device associated with the user account, wherein sending the instructions is further based on a receipt of the user confirmation, and wherein the instructions are sent to the second device.

8. The one or more non-transitory computer-readable storage media of claim 4, wherein each of the first data, the second data, and the third data comprises a different set of parameters, wherein each of the parameters is associated with a weight, and wherein the confidence score is generated based on the weight associated with each parameter.

9. The one or more non-transitory computer-readable storage media of claim 8, wherein generating the confidence score comprises:

setting the weight associated with each parameter based on a device type of the first device;

determining an individual score for each parameter; and summing individual scores based on the weights.

10. The one or more non-transitory computer-readable storage media of claim 4, wherein the operations further comprise:

determining that the confidence score falls between two predefined thresholds;

sending, to the second device, a request for fourth data associated with the first device;

receiving, from the second device, the fourth data; and generating a second confidence score based on the fourth data, wherein the first data and the fourth data have a common parameter;

wherein a weight of the common parameter has a first value when used in generating the confidence score and a second value different from the first value when used in generating the second confidence score.

11. The one or more non-transitory computer-readable storage media of claim 4, wherein the operations further comprise:

setting a weight of a parameter based on a user identifier associated with the first device, the second device, or the one or more devices, wherein the parameter is associated with at least one of the first data, the second data, or the third data, and wherein the confidence score is generated based on the weight.

12. The one or more non-transitory computer-readable storage media of claim 4, wherein the operations further comprise:

determining at least one of a device type of the first device or a user identifier associated with one of the first device, the second device, or the one or more devices; and setting a predefined threshold based on the at least one of the device type or the user identifier, wherein sending the instructions is further based on a comparison of the confidence score and the predefined threshold.

13. A computer system comprising:

one or more processors; and one or more memories storing instructions that, upon execution by the one or more processors, cause the computer system to:

receive, from a second device, first data associated with a first device and second data associated with the second device, the first device not connected to a computer network;

determine third data generated by one or more devices other than the first device and the second device, the third data associated with at least one of: the first device, the second device, a user account associated with the second device, or the computer network;

generate, based on the first data, the second data, and the third data, a confidence score indicating a likelihood of authorization to connect the first device to the computer network; and send, based on the confidence score, instructions associated with connecting the first device to the computer network.

14. The computer system of claim 13, wherein the first data comprises first environmental data generated by a first sensor of the first device, wherein the second data comprises second environmental data generated by a second sensor of the second device, and wherein the confidence score is generated based on a similarity between the first environmental data and the second environmental data.

15. The computer system of claim 13, wherein the one or more memories store further instructions that, upon execution by the one or more processors, cause the computer system to:
  send, to the second device, first random data and second instructions associated with sending the first random data to the first device, wherein the first data comprises second random data detected by the first device, and wherein generating the confidence score is further based on a similarity between the first random data and the second random data.

16. The computer system of claim 15, wherein the first data and the second data is received from the second device based on a probe sent from the first device over a data link between the first device and the second device, and wherein the second instructions indicate that the first random data is to be sent over a different data link.

17. The computer system of claim 13, wherein the first data comprises an internet protocol (IP) address of the first device, and wherein the one or more memories store further instructions that, upon execution by the one or more processors, cause the computer system to:
  determine a geo-location of the first device based on the IP address; and
  determine an association between the geo-location and an area that includes the second device, wherein the confidence score is generated based on the association.

18. The computer system of claim 13, wherein the first data comprises a first list of network identifiers of computer networks detected by the first device, wherein the second data comprises a second list of network identifiers detected by the second device, and wherein the one or more memories store further instructions that, upon execution by the one or more processors, cause the computer system to:
  determine a similarity between the first list and the second list, wherein the confidence score is generated based on the similarity.

19. The computer system of claim 13, wherein the second data comprises a device identifier of the second device, and wherein the one or more memories store further instructions that, upon execution by the one or more processors, cause the computer system to:
  determine, based on the device identifier, the user account; and
  determine, from the user account, historical data about device connections to the computer network, wherein the confidence score is generated based on the historical data.

20. The computer system of claim 13, wherein the third data is received from a third device on the computer network, wherein the third data indicates a detection by the third device of the first device, and wherein generating the confidence score is further based on the detection.

* * * * *

UNITED STATES PATENT AND TRADEMARK OFFICE
CERTIFICATE OF CORRECTION

| | |
|---|---|
| PATENT NO. | : 11,606,690 B1 |
| APPLICATION NO. | : 16/682230 |
| DATED | : March 14, 2023 |
| INVENTOR(S) | : Quentin N. Robinson et al. |

It is certified that error appears in the above-identified patent and that said Letters Patent is hereby corrected as shown below:

In the Claims

Column 28, Line 25, Claim 1:
Delete: "user"

Signed and Sealed this
Twelfth Day of March, 2024

Katherine Kelly Vidal
*Director of the United States Patent and Trademark Office*